United States Patent
Al-Saggaf et al.

(10) Patent No.: US 11,271,620 B1
(45) Date of Patent: Mar. 8, 2022

(54) METHOD FOR SECURE COMMUNICATION IN MU-MASSIVE MIMO SYSTEM VIA BLIND DISTRIBUTED BEAMFORMING

(71) Applicant: King Abdulaziz University, Jeddah (SA)

(72) Inventors: Ubaid M. Al-Saggaf, Jeddah (SA); Muhammad Moinuddin, Jeddah (SA); Yazeed Abdulaziz Alhaqbani, Jeddah (SA); Abdulah Aljohani, Jeddah (SA); Ahmad Kamal Hassan, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/473,453

(22) Filed: Sep. 13, 2021

(51) Int. Cl.
*H04B 7/0452* (2017.01)
*H04B 7/0456* (2017.01)

(52) U.S. Cl.
CPC ......... *H04B 7/0452* (2013.01); *H04B 7/0478* (2013.01)

(58) Field of Classification Search
CPC .............................. H04B 7/0452; H04B 7/0478
See application file for complete search history.

(56) References Cited

U.S. PATENT DOCUMENTS

| | | | |
|---|---|---|---|
| 8,112,038 B2 * | 2/2012 | Li | H04B 7/0617 455/63.1 |
| 2007/0280116 A1 * | 12/2007 | Wang | H04L 1/0029 370/236 |
| 2010/0124930 A1 | 5/2010 | Andrews et al. | |

(Continued)

FOREIGN PATENT DOCUMENTS

| | | |
|---|---|---|
| CN | 108631840 A | 10/2018 |
| CN | 110149127 A | 8/2019 |

OTHER PUBLICATIONS

Chalise, et al, ; Robust Downlink Beamforming Based on Outage Probability Specifications ; IEEE Transactions on Wireless Communications vol. 6, Issue 10 ; Oct. 2007 ; 15 Pages.

*Primary Examiner* — Will W Lin
(74) *Attorney, Agent, or Firm* — Oblon, McClelland, Maier & Neustadt, L.L.P.

(57) ABSTRACT

Devices, methods, and non-transitory computer readable media perform steps for securing communications in a Multi-User (MU), Massive, Multiple Input Multiple Output (MIMO) network. The base station estimates an initial precoding matrix based on a first estimated value of a signal to interference plus noise ratio (SINR) and determines a $k^{th}$ user device outage probability value and an eavesdropper device outage probability value associated with the eavesdropper device. An optimized beamformer weight matrix is determined based on the user device outage probability value and the eavesdropper device outage probability value. The base station determines whether the optimized beamformer weight matrix satisfies at least one outage condition. When the outage condition is satisfied, the base station transmits the optimized beamformer weight matrix to each remote radio head, which transmits downlink signals using a $k^{th}$ beamformer vector of the optimized beamformer weight matrix.

20 Claims, 12 Drawing Sheets

(56) References Cited

U.S. PATENT DOCUMENTS

2013/0078927 A1* 3/2013 Razaviyayn .......... H04B 7/086
 455/73
2015/0103731 A1* 4/2015 Jeon ................... H04B 7/0456
 370/315
2016/0065277 A1 3/2016 Moss et al.

* cited by examiner

METHOD FOR SECURE COMMUNICATION IN MU-MASSIVE MIMO SYSTEM VIA BLIND DISTRIBUTED BEAMFORMING

STATEMENT OF ACKNOWLEDGEMENT

The inventors extend their appreciation to the Deputyship for Research and Innovation, Ministry of Education in Saudi Arabia for funding this research work through the project number 2020-043 and King Abdulaziz University, DSR, Jeddah, Saudi Arabia.

BACKGROUND

Technical Field

The present disclosure is directed to secure communication and more specifically to improved methods of securing communications in massive multi-user multi-input, multi-output (MIMO) systems having a distributed antenna system (DAS).

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

In wireless telecommunications, information security is a critical challenge. Broadcast information can theoretically be accessed by anyone, so this form of communication is at high risk from hackers intercepting the wireless transmission medium. Some systems use physical layer security, which takes advantage of physical properties of the wireless transmission medium to provide secure connections between two communication endpoints. In particular, physical layer security is based on certain performance metrics of the system, for instance "secrecy throughput" and/or "secrecy outage" among others. Secrecy throughput, in the wireless communication context, is the difference between legitimate user throughput and the throughput of a potential eavesdropper. Secrecy outage, also called secrecy outage probability, is another performance-related metric, which can be defined as the probability that a secrecy capacity drops below a threshold requirement of a particular secrecy rate.

Beamforming is another approach to transmitting and receiving signals that, among other features, allows for safer, more secure transmissions. Beamforming uses multiple antennas aligned in a particular pattern or array as part of a base station (BS). A base station, at its most fundamental levels, includes a transmitter and receiver (otherwise known as a transceiver), a controller, a transmission line, and an antenna. When selected signals varying in amplitude and phase are sent or received, interference is created to accentuate the directionality of transmission. The interference may either be constructive or destructive in order to improve the signal for the intended recipient or degrade it for an unintended device.

One approach developed for physical layer security is based on transmit beamforming, where the outage probability of the user is decreased, while that of the wiretapped signal at the eavesdropper device is increased. In other words, the signal transmitted to an intended user is protected when compared to the eavesdropper signal. A number of solutions use random beamforming with the aid of semi-definite relaxation, as seen by Phan et al. ("Non smooth optimization for efficient beamforming in cognitive radio multicast transmission," IEEE Trans. Signal Process., vol. 60, no. 6, pp. 2941-2951, June 2012), which is designed to maximize instantaneous secrecy throughput. Further, multiple investigations by Nasir et al. ("Secrecy rate beamforming for multicell networks with information and energy harvesting," IEEE Trans. Signal Process., vol. 65, no. 3, pp. 677-689, February 2017, and "Secure and energy efficient beamforming for simultaneous information and energy transfer," IEEE Trans. Wireless Commun., vol. 16, no. 11, pp. 7523-7537, November 2017) examine in detail the performance of attempts to maximize instantaneous secrecy throughput with beamforming. There are many other proposed solutions for providing physical layer security based on outage probability, many of which rely on the Bernstein-type inequalities proposed in Bechar ("A Bernstein-type inequality for stochastic processes of quadratic forms of Gaussian variable," Preprint, INRIA Sophia Antiplois, 2009). In Stathakis et al. ("Outage region characterization for beamforming in MISO interference networks with imperfect CSI," IEEE Signal Process. Lett., vol. 22, no. 12, pp. 2378-2382, December 2015), the region characterized by outage conditions was derived for given beamforming coefficients based on imperfect channel state information (CSI). Each of the above references are incorporated herein by reference in its entirety.

Multi-User Massive Multiple Input Multiple Output (MU-Massive-MIMO) technology is a telecommunications approach using a large number of antenna arrays at every base station (BS) within a carrier network. In order to implement a distributed antenna system, remote radio heads (RRHs, sometimes alternatively referred to as remote radio units) can be utilized at the base station. The transmitted signal is then distributed independently to all users serviced by the BS. Each RRH employs beamforming to enhance signal quality. Thus, the task of physical layer security is to optimize the system parameters that can guarantee secure communication for each user in terms of a certain previously agreed upon Quality of Service (QoS).

While this distribution decreases likelihood of eavesdropping on the communication, some prior techniques to security approach the issue from the perspective of a signal precoding matrix. Precoding allows the transmitter to send a weighted signal based on predicted channel conditions, or channel state information (CSI) so that the computation required by the receiver is reduced and so that the receiver does not need to have knowledge of the CSI. In other words, the receiver becomes a simple detector rather using equally complex computation to decode the signal.

Another major concern in wireless communication is energy efficiency. Energy efficiency and security can be addressed simultaneously using a performance metric known as secure energy efficiency. This value is defined as the ratio of secrecy throughput to total network power consumption (given in units of secrecy bits per Joule per Hertz). Some investigation has been conducted into the combination of the physical layer security and energy efficiency, several times using the aid of perfect CSI for secure energy efficiency maximization. These techniques involved beamformers designed to cancel multi-user interference, as well as the wiretapped signal received at an eavesdroppers device. However, the computational complexities of these algorithms that optimize signal cancellation are very high even for single-user multi-input multi-output (MIMO) and single-input single-output (SISO) communications. Nguyen et al. ("MIMO beamforming for secure and energy-efficient wireless communication," IEEE Signal Process. Lett., vol. 24, no. 2, pp. 236-239, February 2017) have attempted to optimize secure energy efficiency in order to develop secure MIMO system communication. Nasir et al. ("Secure and energy efficient beamforming for simultaneous information and energy transfer," full citation above), on the other hand, considered worst case scenarios of uncertainties for user and eavesdropper channels in an effort to implement secure energy efficiency optimization.

Another technique commonly relied upon to improve physical layer security is the use of artificial noise. Purposefully generated artificial noise, generated in the null space of the legitimate user channel, can be introduced to degrade a signal to interference-plus-noise ratio (SINR) of an eavesdropper's device without any corresponding disturbance in the SINR of the legitimate user (such as seen in Goel and Negi, "Guaranteeing secrecy using artificial noise," IEEE Trans. Wireless Commun., vol. 7, no. 6, pp. 2180-2189, June 2008). The signal-to-interference-plus-noise ratio (SINR) is a measurement of channel capacity (i.e., the rate of information that can be transferred) in wireless communication networks. This metric mirrors the signal-to-noise ratio (SNR) found in wired communications networks. As implied by the name, the SINR is characterized as a power of a signal divided by the sum of the interference power (from all interfering signals) and the power of relevant background noise. Because certain types of wireless networks and signal propagation models, particularly cellular or mobile phone networks, include great complexity and/or randomness, the use of stochastic geometry models in order to model the SINR are common. Secure beamforming that maximizes the SINR for a legitimate user while imposing a limit on the eavesdropper SINR by using an artificial noise aid has also been proposed by Liao et al. ("QoS-based transmit beamforming in the presence of eavesdroppers: An optimized artificial-noise-aided approach", IEEE Transactions on Signal Processing Vol. 59, no. 3, pp. 1202-1216, March 2011).

Zhu et al. ("Secure transmission in multicell massive MIMO systems," IEEE Trans. Wireless Commun., vol. 13, no. 9, pp. 4766-4781, September 2014) have shown that systems implementing Massive MIMO can enhance the physical layer security in multi-user communication by increasing the SINR of the legitimate user and increasing the energy of artificial noise in the direction of an attempted eavesdropper device. Another aspect of massive MIMO that can prove advantageous is the simplified uplink detection and downlink precoding methods it permits in cancelling inter-user interference. As the number of BS antennas increases to a large number, channels of different users in massive MIMO systems become orthogonal. Based on this characteristic, massive MIMO systems can generate artificial noise efficiently in the null space of legitimate user channels as a byproduct.

If a Massive MIMO system can be deployed in a distributed fashion using several remote radio heads (RRHs), the transmission system can be used efficiently. In such arrangements, RRHs are connected to a central system via high-speed fiber, which can be referred to as a distributed antenna system (DAS). In addition, a distributed system allows RRHs to cooperate in the UL channel estimation and DL beamforming tasks implemented via radio-over-fiber techniques. This interconnected function means that despite placement to the contrary, the RRHs can be treated as if they were co-located base station antennas in the more conventional massive MIMO system. In Guo et al. ("Distributed antennas aided secure communication in MU-massive-MIMO with QoS guarantee," 2015 IEEE 82nd Veh. Technol. Conf. VTC Fall 2015-Proc., 2016), an artificial noise-based precoding scheme is proposed for distributed antenna implementation in a MU-Massive-MIMO system.

Rusek (European Patent 2833558B1, incorporated by reference herein in its entirety) has patented an algorithm for physical layer security in Massive MIMO communication. Wenyu et al. (Chinese patent 102158857B, incorporated herein in its entirety) developed an algorithm for secure communication in a MISO system based on the radio channel characteristics of its encryption method. Mookiah et al. (US Patent Application 2015/0135293A1, incorporated herein in its entirety) describes a security algorithm for a MIMO system with multi-element reconfigurable antennas. Mookiah's algorithm includes a generalized likelihood ratio (GLR) test to differentiate the channel, but this is based on a fingerprint from the desired user and the intruder.

However, none of the previous methods described above use physical layer security in MU-Massive MIMO distributed communication. Moreover, each of the existing techniques employ the knowledge of instantaneous CSI at the BS, which results in a higher bandwidth requirement.

Each of the aforementioned systems and methods suffers from one or more drawbacks hindering their adoption, such as bandwidth resources needed or other computational requirements. Accordingly, it is one object of the present disclosure to provide methods and systems of secured communication in a Multi-User (MU) Massive, Multiple-Input, Multiple-Output (MIMO) network.

SUMMARY

In an exemplary embodiment, a method of securing communications in a Multi-User (MU) Massive-Multiple Input Multiple Output (MIMO) network includes a base station and a first plurality of C remote radio heads. Each remote radio head includes M/C antennas arrays, where M is the total number of antenna arrays of the C remote radio heads. Each radio head is connected to the base station by a high-speed fiber cable. The MU Massive, MIMO network includes a second plurality of K user devices, and a third plurality of eavesdropper devices. The method includes estimating, by the base station, an initial precoding matrix based on a first estimated value of a signal to interference plus noise ratio (SINR). The base station determines a $k^{th}$ user device outage probability value based on the estimated initial precoding matrix. The user device outage probability value indicates a probability of an outage to occur on the $k^{th}$ user device within a first time period. The base station determines an eavesdropper device outage probability value associated with an eavesdropper device with respect to the $k^{th}$ user device. The eavesdropper device outage probability value indicates a probability of an outage to occur on the eavesdropper device within a second time period. The base station determines an optimized beamformer weight matrix based on the $k^{th}$ user device outage probability value and the eavesdropper device outage probability value. The base station determines whether the optimized beamformer weight matrix satisfies at least one of a plurality of outage conditions. When the optimized beamformer weight matrix satisfies the at least one of the plurality of outage conditions, the base station transmits, through the high-speed fiber cable, the optimized beamformer weight matrix to each remote radio head. Each remote radio head transmits downlink signals from each antenna array at the first estimated value of the SINR to the $k^{th}$ user device using a $k^{th}$ beamformer vector of the optimized beamformer weight matrix.

In another exemplary embodiment, a system for secured communication in a Multi User (MU) Massive-Multi User Multiple Input Multiple Output (MIMO) network includes a base station, a first plurality of C remote radio heads, a second plurality of K user devices, and a third plurality of eavesdropper devices. The base station includes transceiver circuitry, a first antenna array, a controller, a memory including program instructions and at least one processor. The first plurality of remote radio heads each include M/C antennas arrays, where M is a total number of antenna arrays of the first plurality of C remote radio heads. Each radio head is operatively connected to the base station by a high-speed fiber cable. The memory further includes historic data associated with previous communications and a plurality of outage conditions. The processor is configured to retrieve the historic data, estimate a first estimated value of a signal to interference plus noise ratio (SINR), generate an optimized beamformer weight matrix, and determine whether the optimized beamformer weight matrix satisfies at least one of a plurality of outage conditions. When the optimized beamformer weight matrix satisfies the at least one of the plurality of outage conditions, the processor is configured to transmit, through the high-speed fiber cables, the optimized beamformer weight matrix to each remote radio head. Each remote radio head is configured to transmit downlink signals from each antenna array at the first estimated value of the SINR to a $k^{th}$ user device using a $k^{th}$ beamformer vector of the optimized beamformer weight matrix.

In another exemplary embodiment, a non-transitory computer readable medium has instructions stored therein that, when executed by one or more processors, cause the one or more processors to perform a method of securing communications in a Multi-User (MU), Massive-Multiple Input Multiple Output (MIMO) network including a base station. The network includes a first plurality of C remote radio heads, each including M/C antennas arrays, where M is the total number of antenna arrays of the C remote radio heads. Each radio head is connected to the base station by a high-speed fiber cable. The network also includes a second plurality of K user devices and a third plurality of eavesdropper devices. The method includes estimating, by the base station, an initial precoding matrix based on a first estimated value of a signal to interference plus noise ratio (SINR). The base station determines a $k^{th}$ user device outage probability value based on the estimated initial precoding matrix. The user device outage probability value indicates a probability of an outage to occur on the $k^{th}$ user device within a first time period. The base station determines an eavesdropper device outage probability value associated with a $k^{th}$ eavesdropper device. The eavesdropper device outage probability value indicates a probability of an outage to occur on the eavesdropper device within a second time period. The base station determines an optimized beamformer weight matrix based on the $k^{th}$ user device outage probability value and the eavesdropper device outage probability value. The base station determines whether the optimized beamformer weight matrix satisfies at least one of a plurality of outage conditions. When the optimized beamformer weight matrix satisfies the at least one of the plurality of outage conditions, the base station transmits, through the high-speed fiber cable, the optimized beamformer weight matrix to each remote radio head. Each remote radio head transmits downlink signals from each antenna array at the first estimated value of the SINR to the $k^{th}$ user device using a $k^{th}$ beamformer vector of the optimized beamformer weight matrix. When the optimized beamformer weight matrix does not satisfy the at least one of the plurality of outage conditions, the base station generates a second estimated SINR by adding 1 to the first estimated SINR. The base station generates a second optimized beamformer weight matrix using the second estimated SINR and determines whether the second optimized beamformer weight matrix satisfies at least one of the plurality of outage conditions. When the second optimized beamformer weight matrix satisfies the at least one of the plurality of outage conditions, the base station transmits, through the high-speed fiber cable, the optimized beamformer weight matrix to each remote radio head. When the second optimized beamformer weight matrix does not satisfy at least one of the plurality of outage conditions, the second estimated SINR is incremented by adding 1 at each iteration, forming an incremented optimized beamformer weight matrix at each iteration until the incremented beamformer weight matrix satisfies at least one of the plurality of outage conditions, and the incremented beamformer weight matrix is transmitted to each radio head.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
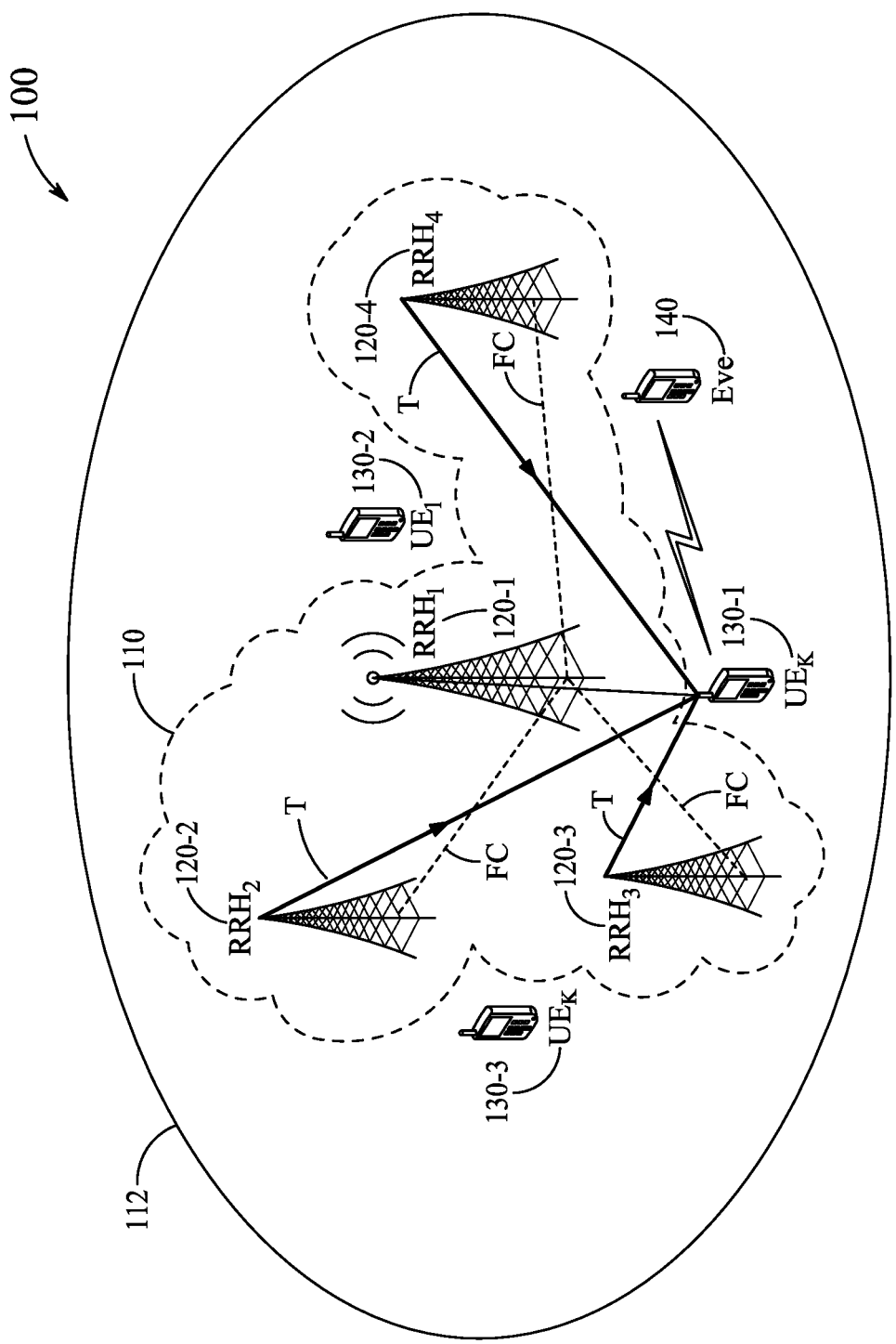
FIG. 1 is a schematic diagram of a system for secured communications in a Multi-User (MU) Massive, Multiple-Input, Multiple-Output (MIMO) network, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

According to embodiments, a blind beamforming design is employed in a distributed antenna system (DAS) where multiple RRHs are utilized in a base station to transmit signals independently to all the users. Each RRH employs beamforming to enhance the user's outage probabilities while maximizing eavesdropper outage probabilities.

As part of the overall base station system, a small module may be employed called a remote radio head (RRH, sometimes alternatively referred to as a remote radio unit (RRU), but indicating the same type of device). This component is in communication with the processing portion of the base station by an appropriate fiber connection (i.e., fiber cable). RRHs/RRUs can be located outside, and at times are co-located with antenna towers to minimize the effects of transmission line loss. RRHs/RRUs execute radio frequency (RF) functionality associated with the transmission and reception functions of the base station, such as signal transmission and reception, filtering, amplification, and various forms of conversions that arise (e.g., analog-to-digital, digital-to-analog, up/down conversion, etc.). An RRH may also have advanced functionality to provide monitoring features or to allow network providers to enhance performance of the network from centralized or remote locations.

Referring to FIG. 1, a schematic diagram of a system 100 for secured communication in a Multi-User (MU) Massive, Multiple-Input, Multiple-Output (MIMO) network is depicted, according to certain embodiments. Secured communication system 100 includes a distributed antenna system (DAS) 110 having a plurality of remote radio heads (RRHs) 120-1, 120-2, 120-3, and 120-4 (collectively referred to as RRHs 120) arranged to provide communication services for a plurality of users. RRHs 120 are connected to one another over fiber optic connections, denoted as FC. DAS 110 is at least a portion of a base station associated with the RRHs. As will be understood by one of skill in the relevant art, DAS 110 can contain additional components for enabling communications, such as other base station components, processors, memories, transmission lines, switches, routers, and other centralized control and management servers as typically are found in complex telecommunications networks. The antenna towers and RRHs shown in FIG. 1 are represented in a simplified manner so as not to obscure certain aspects of the instant application.

User equipment (UE) 130-1, a UE 130-2 and a UE 130-2 (collectively referred to as UEs 130) associated with the users are shown within a service area 112 within DAS 110 (denoted by the circle surrounding the outer RRH 120-2, 120-3, and 120-4). DAS 110 is not limited to the number of RRHs or UEs as shown. For the relationships described in the equations below, the variable "C" will be used to describe the number of RRHs in DAS 110, while "K" users/user equipment are assumed within service area 112. Thus, C=4 and K=3 in the depicted example, but other combinations are contemplated and possible. A given user/user equipment of DAS 110 can be generically referred to as the $k^{th}$ user in the equations that follow. A given RRH can also be generically referred to as the $c^{th}$ RRH in the below-described relationships. Further, a channel vector between the $k^{th}$ user and $c^{th}$ RRH can be represented as $h_{ck}$.

Also shown in FIG. 1 is an eavesdropper device 140. While only a single eavesdropper device is shown for simplicity, embodiments in the instant application can be applied with respect to additional eavesdropper devices as well. A channel vector between device 140 and the $c^{th}$ RRH can be denoted as $h_{cE}$. Each of RRH 120 also includes a respective antenna array (not shown or numbered) in order to transmit and receive signals with UEs 130. The total number of antennas across all of RRH 120 can be denoted as "M" antennas. With the assumption of evenly distributed numbers of antenna arrays and antennas, each RRH 120 will have M/C antennas, which can be denoted as $M_C$.

RRHs 120 are configured to serve every user in the service area 112. Consequently, the respective antenna arrays of RRHs 120 are configured to transmit to every UE 130 in the service area 112. Every RHH 120 can be configured to transmit at the same signal power, denoted as $p_f$. A transmission signal from the RRH 120 to the UE 130 in the downlink (DL) direction can be expressed as shown in Equation 1 below.

$$x = \sqrt{p_f} W s \quad (Eq.\ 1)$$

In Equation 1, "s" is the vector containing input signal for all K users. Accordingly, "s" is a vector containing input signals for users 1 through K, which can be represented as $s=[s_1, \ldots, s_K]T$. The signals in "s" are independent and identically distributed with unit energy (i.e., $\mathbb{E}\{|s_k|^2\}=1$). The other variable shown in Equation 1, W, is a precoding matrix for secure communication in network 110. When considering M antenna arrays and K users, W is an M by K matrix.

Referring to the notation given above, the received signals at the $k^{th}$ user and at eavesdropper device 140 can be shown by Equations 2 and 3, respectively, below.

$$r_K = h_k^H x + n_k \quad (Eq.\ 2)$$

$$r_E = h_E^H x + n_E \quad (Eq.\ 3)$$

In Equation 2, $h_k=[h_{1k}^T\ h_{2k}^T\ \ldots\ h_{ck}^T]$ is the combined channel vector for all users (i.e., the M by 1 combined channel vector), while $h_E$ represents the M by 1 combined channel vector for all users as relating to eavesdropper device 140. Further, $h_k$ is assumed to be a complex zero-$\mathcal{CN}$ mean Gaussian random vector, i.e., $h_k \sim \mathcal{CN}(0 \cdot R_k)$, where $R_k$ is the co-variance matrix of $h_k$. For each equation, the final $n^{th}$ term (e.g., $n_k$, $n_E$) represents the zero-mean complex additive white Gaussian noise for its respective measurement (i.e., $n_k \sim \mathcal{CN}(0 \cdot \sigma_k^2)$, where $\sigma_k^2$ is the variance of $n_k$ and $n_E \sim \mathcal{CN}(0 \cdot \sigma_E^2)$, where $\sigma_E^2$ is the variance of $n_E$.

The following description outlines an example approach for designing a precoding matrix W which enhances a user's outage probabilities, while maximizing the outage probability of eavesdropper device 140 (i.e., lowers the user's outage probability and raises the eavesdropper device's outage probability). The design begins with the substitution of x from Equation 1 into Equation 2 as seen in the equation below to express the received signal at the $k^{th}$ user.

$$r_k = \sqrt{p_f}\, h_k^H w_k s_k + \sqrt{p_f} \sum_{\substack{i=1 \\ i \neq k}}^{K} h_k^H w_i s_i + n_k \quad (Eq.\ 4)$$

Here the M×K precoding matrix W can be expressed as $W=[w_1\ w_2\ \ldots\ w_K]$, where each $w_k$ represents the M×1 beamformer vector associated with user k. When expressed as seen in Equation 4, the first term is the signal for $k^{th}$ user (i.e., the square root of the power, $\sqrt{p_f}$, multiplied by the three vector quantities of h, w, and s at the $k^{th}$ user). The middle term (i.e., the square root of the power multiplied by the sum (Σ) of the three vector quantities of h, w, and s for all users except for the $k^{th}$ user) is the multi-user interference component. The final term, $n_k$, is the zero-mean complex additive white Gaussian noise.

The signal to interference-plus-noise ratio (SINR) for the $k^{th}$ user, denoted as $r_k$, can be represented as seen in Equations 5 and 6 below. Equation 5 expresses this signal with a vector norm.

$$r_k = \frac{p_f |h_k^H w_k|^2}{p_f \sum_{\substack{i=1 \\ i \neq k}}^{K} |h_k^H w_i|^2 + \sigma_k^2} \quad (Eq.\ 5)$$

Equation 5 can be expressed in terms of weighted norms as shown in Equation 6 below by using the linear algebra property for the vector norm.

$$r_k = \frac{p_f \|h_k\|^2_{w_k w_k^H}}{p_f \sum_{\substack{i=1 \\ i \neq k}}^{K} |h_k^H w_i|^2 + \sigma_k^2} \quad (Eq.\ 6)$$

The weighted norm of any generic vector v can be expressed as shown below in Equation 7. The whitened channel vector from channel vector $h_k$, that is the vector that has a whitening transformation applied, can be denoted as $\bar{h}_k$. Using the matrices A and B defined in Equations 8 and 9 below, the SINR of the $k^{th}$ user can be expressed in a final form as seen in the representation of Equation 10 below.

$$\|v\|^2_N = v^H N v \quad (Eq.\ 7)$$

$$A = p_f R_k^{1/2} w_k w_k^H R_k^{H/2} \quad (Eq.\ 8)$$

$$B = p_f R_k^{1/2} \left( \sum_{\substack{i=1 \\ i \neq k}}^{k} w_i w_i^H \right) R_k^{H/2} \quad (Eq.\ 9)$$

$$r_k = \frac{p_f \|h_k\|^2_{w_k w_k^H}}{p_f \|h_k\|^2_{\sum w_i w_i^H} + \sigma_k^2} = \frac{\|\bar{h}_k\|^2_A}{\|\bar{h}_k\|^2_B + \sigma_k^2} \quad (Eq.\ 10)$$

The probability of outage for the $k^{th}$ user, denoted by $F_k(W,\zeta)$, can be calculated by determining the probability that $r_k < \zeta$. There are two equivalent expressions for this probability shown below in Equation 11 (where the notation Pr(.) denotes a probability of a function within the parenthesis). A probability density function of the whitened channel vector $\bar{h}_k$, denoted by $p(\bar{h}_k)$, and a probability density function of a unit step function, denoted by u(.), can be used to rewrite the probability function in Equation 12. That probability can be expressed yet another way in Equation 13, after solving for the multi-dimensional integral involving the complex number in Equation 12. The outage probability for the kth user $F_k(W,\zeta)$ can then be rewritten in Equation 13, where $\lambda_n$ is the eigenvalue of the matrix A−ζB.

$$F_k(W, \zeta) = Pr\left( \frac{\|\bar{h}_k\|^2_A}{\|\bar{h}_k\|^2_B + \sigma_k^2} < \zeta \right) = Pr(\zeta \sigma_k^2 + \|\bar{h}_k\|^2_{\zeta B - A} > 0) \quad (Eq.\ 11)$$

$$F_k(W, \zeta) = \int_{-\infty}^{\infty} p(\overline{h}_k) u(\zeta \sigma_k^2 + \|\overline{h}_k\|_{\zeta B-A}^2) d\overline{h}_k \quad \text{(Eq. 12)}$$

$$F_k(W, \zeta) = 1 - \sum_{n=1}^{N} \frac{\lambda_{ne}^N}{\prod_{\substack{i=1 \\ i \neq n}}^{N} (\lambda_n - \lambda_i)|\lambda_n|} u\left(\frac{\sigma_k^2 \zeta}{\lambda_n}\right) \quad \text{(Eq. 13)}$$

To calculate the outage probability for the eavesdropper device 140 with respect to the $k^{th}$ user, a similar approach as described before may be used. With the substitution of x from Equation 1 into Equation 3 the received signal at the $k^{th}$ user can be expressed in Equation 14 below. Equation 14 includes a term for the eavesdropper device 140 (the first term) (i.e., the square root of the power, f, multiplied by the three vector quantities of h, w, and s at eavesdropper device with respect to the $k^{th}$ user). The middle term of the equation (i.e., the square root of the power multiplied by the sum ($\Sigma$) of the three vector quantities of h, w, and s for the eavesdropper device with respect to all users except for the $k^{th}$ user) is for the multi-user interference component. A noise component, represented as $n_E$, is the final term.

$$r_E = \sqrt{p_f} h_E^H w_k s_k + \sqrt{p_f} \sum_{\substack{i=1 \\ i \neq k}}^{K} h_E^H w_i s_i + n_E \quad \text{(Eq. 14)}$$

The signal to interference-plus-noise ratio (SINR) of the eavesdropper device 140 with respect to the $k^{th}$ user, denoted as $r_{E,k}$, can be represented as seen in Equation 15.

$$r_{E,k} = \frac{p_f |h_E^H w_k|^2}{p_f \sum_{\substack{i=1 \\ i \neq k}}^{K} |h_E^H w_i|^2 + \sigma_E^2} \quad \text{(Eq. 15)}$$

The whitened channel vector from channel vector $h_E$, that is the vector that has a whitening transformation applied, can be denoted as $\overline{h}_E$. Using the matrices C and D defined in Equations 16 and 17, respectively below, the SINR of the eavesdropper device 140 with respect to the $k^{th}$ user can be expressed in a final form as seen in Equation 18 below.

$$C = p_f R_E^{1/2} w_k w_k^H R_E^{H/2} \quad \text{(Eq. 16)}$$

$$D = p_f R_E^{1/2} \left(\sum_{\substack{i=1 \\ i \neq k}}^{K} w_i w_i^H\right) R_E^{H/2} \quad \text{(Eq. 17)}$$

$$r_{E,k} = \frac{p_f \|h_E\|_{w_k w_k^H}^2}{p_f \|h_E\|_{\Sigma w_i w_i^H}^2 + \sigma_k^2} = \frac{\|\overline{h}_E\|_A^2}{\|\overline{h}_E\|_B^2 + \sigma_k^2} \quad \text{(Eq. 18)}$$

Again, replicating the method used to derive the outage probability for the $k^{th}$ user, Equations 19 and 20 can be used to express the outage probability of the eavesdropper device 140 with respect to the $k^{th}$ user, denoted by $E_k(W,\zeta)$. In Equation 20, the term $\delta_t$ denotes the eigenvalue of the matrix $C-\gamma_{th}D$.

$$E_k(W, \zeta) = Pr\left(\frac{\|\overline{h}_E\|_C^2}{\|\overline{h}_E\|_D^2 + \sigma_E^2} < \zeta\right) \quad \text{(Eq. 19)}$$

$$E_k(W, \zeta) = 1 - \sum_{t=1}^{I} \frac{\delta_n^N e^{-\sigma_E^2 \zeta/\delta_t}}{\prod_{\substack{i=1 \\ i \neq n}}^{T} (\delta_t - \delta_i)|\delta_t|} u\left(\frac{\sigma_E^2 \zeta}{\delta_t}\right) \quad \text{(Eq. 20)}$$

According to an embodiment of the present application, a constrained multi-objective minimization problem is solved for the predefined threshold value $\zeta$ in order to generate optimum beamforming weights. This minimization problem can be defined as shown below in Equation 21, where $F_k(W,\zeta)$ denotes the outage probability for the $k^{th}$ user (e.g., UE 130-1) and $E_k(W,\zeta)$ represents the outage probability for the eavesdropper device 140 with respect to the $k^{th}$ user. The constraint as shown below is used to ensure that the outage probability for the eavesdropper device 140 increases from its initial value $E_k(W^{int},\zeta)$ $$\min_{\{w\}} \quad \{F_k(W, \zeta)\}_{k=1}^{K} \quad \text{(Eq. 21)}$$

$$\text{sub. to} \quad \{E_k(W^{opt}, \zeta) \geq E_k(W^{int}, \zeta)\}_{k=1}^{K}$$

In an embodiment, a Sequential Quadratic Programing (SQP) method is used to solve Equation 21 to obtain the optimum beamforming weights. To apply the SQP method, the multi-objective function of Equation 21 can be converted to a single objective function $J_{obj}(W,\zeta)$ as shown in Equation 22. The range of the objective function is restricted between 0 and 1 (i.e., $0 \leq J_{obj}(W,\zeta) \geq 1$) by a constant coefficient denoted as 1/K as represented in Equation 22.

$$\min_{\{w\}} \quad \frac{1}{K} \sum_{k=1}^{K} F_k(W, \zeta) \quad \text{(Eq. 22)}$$

$$J_{obj}(W, \zeta) = \text{sub. to} \quad \sum_{k=1}^{K} F_k(W^{opt}, \zeta) \leq \sum_{k=1}^{K} F_k(W^{int}, \zeta)$$

$$\text{and} \quad \sum_{k=1}^{K} E_k(W^{opt}, \zeta) \geq \sum_{k=1}^{K} E_k(W^{int}, \zeta)$$

As seen above, the first constraint ensures that the sum probability outage of users with the optimized beam-former are upper bounded by the sum outage probability of users with initialized beam-former, i.e., that the sum outage probability of users drops after optimization. The second constraint ensures that the sum outage probability of the eavesdropper device with respect to the $k^{th}$ user, after optimization, should be lower bounded by the sum outage probability of the eavesdropper device before the optimization is performed (i.e., that the sum outage probability of the eavesdropper device rises after optimization).

In some embodiments, the system further includes a memory in the base station (not shown or numbered) storing historic SINR data. One or more processors in the base station can retrieved the historic SINR data. In other embodiments, the historic SINR data can be retrieved from another memory, such as a centrally located storage memory. In certain embodiments, the base station associated with DAS 110 estimates the first estimated value of the SINR from the historic SINR data.

Thus, the precoding weighting matrix described above can be used for optimization of the system shown in FIG. 1. This does not require instantaneous CSI knowledge. Rather, an optimized beamforming matrix is constructed using fewer computational resources and in a more spectrally efficient manner due to the reduced need for bandwidth. This allows for the both the decrease in outage probability for the UEs 130, as well as an increase in the outage probability for an eavesdropper device 140.

Figure 2:
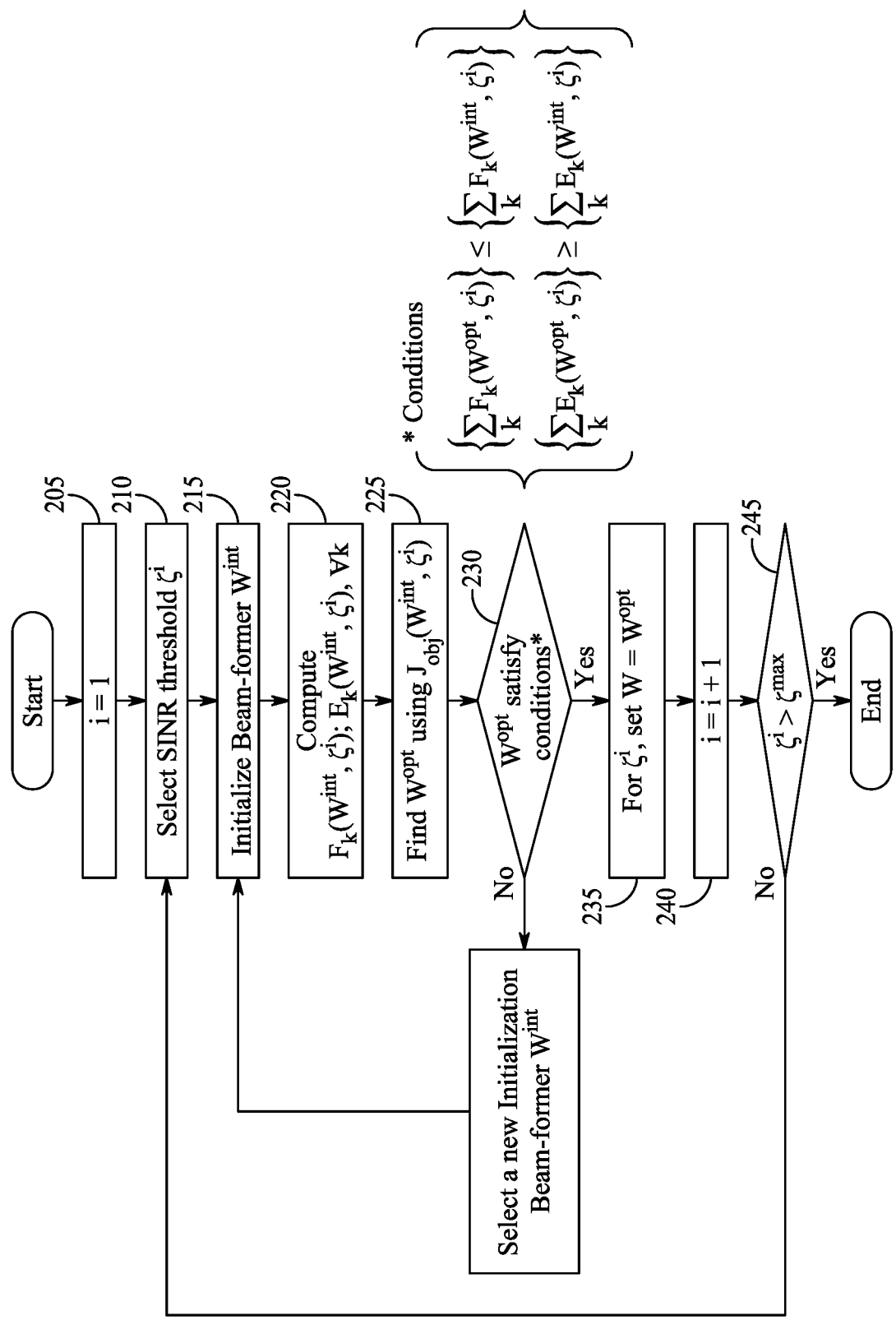
FIG. 2 is an exemplary flowchart representing a method of securing communications in a Multi-User (MU) Massive, Multiple-Input, Multiple-Output (MIMO) network, according to certain embodiments.

Turning now to FIG. 2, a flowchart representing a method 200 of securing communications in a Multi-User (MU) Massive, Multiple-Input, Multiple-Output (MIMO) network is shown, according to some embodiments. Method 200 shown in FIG. 2 implements a sequential quadratic programming (SQP) routine, which minimizes iterations that terminate at undesirable or undefined values. This type of algorithm is selected to avoid results such as ∞ or 0/0. Other types of routines achieving similar results in a suitable manner may be substituted for the following and are contemplated within the scope of the instant application.

The network for carrying out method 200 can be understood to include those elements shown in system 100 of FIG. 1 above. At a first step 205, the value of a time index, denoted as i, is initialized as one (1). At a step 210, a first estimated value of signal to interference plus noise ratio threshold at that time index, denoted as $\zeta^i$, is estimated. In some embodiments, historic SINR data is retrieved from a base station memory and the first estimated value of the SINR $\zeta^i$ is estimated by the base station from the historic SINR data. At a step 215, the base station estimates an initial precoding matrix, $W^{int}$, based on the first estimated value of SINR $\zeta^i$.

At a step 220, the base station determines values for each of a $k^{th}$ user device outage probability value based on the estimated initial precoding matrix, denoted as $F_k(W^{int},\zeta^i)$ and an eavesdropper device outage probability value associated with an eavesdropper attempting to intercept the signal of the $k^{th}$ user device, denoted as $E_k(W^{int},\zeta^i)$.

The step 220 of determining an outage probability, $F_k(W, \zeta)$ associated with the $k^{th}$ user device is based on Equation 13 as found above, but reproduced below:

$$F_k(W, \zeta) = 1 - \sum_{n=1}^{N} \frac{\lambda_n^N e^{-\sigma_k^2 \zeta / \lambda_n}}{\prod_{\substack{i=1 \\ i \neq n}}^{N} (\lambda_n - \lambda_i)|\lambda_n|} u\left(\frac{\sigma_E^2 \zeta}{\lambda_n}\right)$$

where W is the optimized beamformer weight matrix, n=1–N is a first time index is the SINR threshold, $\sigma_k$ is a standard deviation of a zero mean complex additive white Gaussian noise at the $k^{th}$ user device, $\lambda_n$ is an eigenvalue of a matrix A–$\zeta$B, where A and B are defined as given above in Equations 8 and 9. As described previously in defining A and B, $p_f$ is a signal power of the downlink signal, H is a complex zero-mean Gaussian random vector $w_k$ is a $k^{th}$ vector of the matrix W, and $R_k$ is a received signal at the $k^{th}$ user device (e.g., UE 130).

Also part of step 220, determining an outage probability $E_k(W,\zeta)$ associated with the eavesdropper device (e.g., eavesdropper device 140) with respect to the $k^{th}$ device is based on Equation 20 noted above and reproduced below:

$$E_k(W, \zeta) = 1 - \sum_{t=1}^{T} \frac{\delta_n^N e^{-\sigma_E^2 \zeta / \delta_t}}{\prod_{\substack{i=1 \\ i \neq n}}^{T} (\delta_t - \delta_i)|\delta_t|} u\left(\frac{\sigma_E^2 \zeta}{\delta_t}\right)$$

where t=1 to T is a second time index, $\sigma_k$ is a standard deviation of a zero mean complex additive white Gaussian noise at the eavesdropper device with respect to the $k^{th}$ device, $\delta_t$ is an eigenvalue of a matrix C–$\gamma_{th}$D, where the matrices C and D are defined in Equations 16 and 17.

At a step 225, the base station determines an optimized beamformer weight matrix, denoted as $W^{opt}$, based on the $k^{th}$ user device outage probability value and the eavesdropper device outage probability value with respect to the $k^{th}$ user device. The optimized beamformer weight matrix $W^{opt}$ is found using a function, depicted above in Equation 22 and denoted as $J_{obj}(W,\zeta)$. This function is a single-objective function resulting from the transformation of a multi-objective function. The single-objective function is further constrained by a constant coefficient that restricts the values of $J_{obj}(W,\zeta)$ as falling between 0 and 1 (i.e., a probability between 0 and 100 percent).

At a step 230, a check is made of at least two conditions that make up a part of $J_{obj}(W,\zeta)$. A first condition is whether or not the sum of $F_k(W^{opt},\zeta^i)$ is less than or equal to the sum of $F_k(W^{int},\zeta^i)$, i.e., the sum outage probability for the user device has improved or remained the same, but is not worse than before optimizing. A second condition is whether or not the sum of $E_k(W^{opt},\zeta^i)$ is greater than or equal to the sum of $E_k(W^{int},\zeta^i)$, i.e., the outage probability of the eavesdropper device is worse or the same, but is not better than before the optimization. If both conditions are not met, the method returns to step 215 to select a new initial beam-forming matrix $W^{int}$.

Thus, when method 200 returns to step 215 when the optimized beamformer weight matrix does not satisfy the outage conditions, the repeated step 215 results in the base station generating a second estimated SINR by adding 1 to the first estimated SINR at a repeated step 220. The base station generates a second optimized beamformer weight matrix using the second estimated SINR at a repeated step 225. At a repeated step 230, the base station determines whether the second optimized beamformer weight matrix satisfies the outage conditions.

When the second optimized beamformer weight matrix does not satisfy the outage conditions at step 230, the second estimated SINR is further incremented by adding 1 at each iteration, forming an incremented optimized beamformer weight matrix at each iteration until the incremented beamformer weight matrix satisfies the outage conditions.

When the second optimized beamformer weight matrix satisfies the outage conditions at step 230, the matrix of values for W is set as $W^{opt}$ at step 235. When the optimized beamformer weight matrix satisfies the outage conditions and $W^{opt}$ is set at step 235, the base station further transmits, through the high-speed fiber cable, the optimized beamformer weight matrix $W^{opt}$ to each remote radio head. Each remote radio head in turn transmits downlink signals from each antenna array at the estimated value of the SINR $\zeta^i$ to the $k^{th}$ user device using a $k^{th}$ beamformer vector of the optimized beamformer weight matrix.

The time index value i is incremented by one at a step 240. Once the index value has been incremented at step 240, a comparison is made to check whether $\zeta^i$ is greater than an SINR threshold value, denoted as $\zeta$ max. The SINR threshold value, $r_k$ for the $k_{th}$ user device can be calculated based on Equation 5 shown above. If $\zeta^i$ is greater than $\zeta^{max}$, then the algorithm is terminated. If $\zeta^i$ is not greater than $\zeta^{max}$, then the algorithm returns to step 210 to reiterate the matrix optimization process for the incremented SINR threshold value.

In some embodiments, the base station can perform a whitening transformation of the SINR threshold value for the $k_{th}$ user device, $r_k$, such that $r_k$ (whitened) is given by Equation 8 above and reproduced as follows, where $\bar{h}_k$ is a white noise vector.

$$\frac{\|\bar{h}_k\|_A^2}{\|\bar{h}_k\|_B^2 + \sigma_k^2},$$

Analytical Expressions Vs. Simulated Results

Turning to Figs. FIG. 3A to FIG. 8B, analytical expressions outlined above are plotted against simulated results using the above method of improving physical layer security. Each of the various plots represents a theoretical set of values versus a simulation set of values for a user based on a variety of parameters. With each figure, a separate plot is given for each user, k. For example, figure A in each is for user 1, figure B is for user 2, and so forth. For each scenario, Monte Carlo simulations with 1000 runs were performed and the noise variance for both users and eavesdropper devices was fixed at 20 dB for the simulation portion of the graph.

Figure 3A:
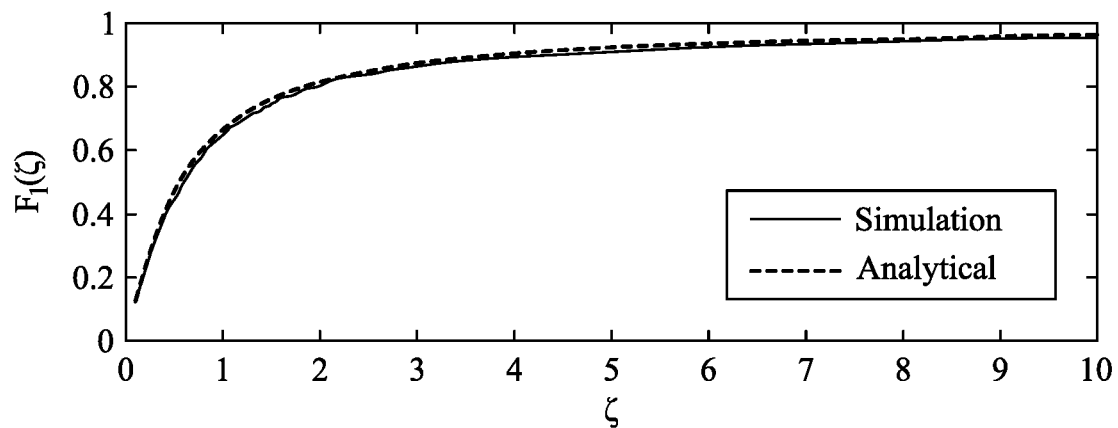
FIG. 3A is a graph of the analytical and simulation results of outage probabilities for a first user, in a two user system, according to certain embodiments.
Figure 3B:
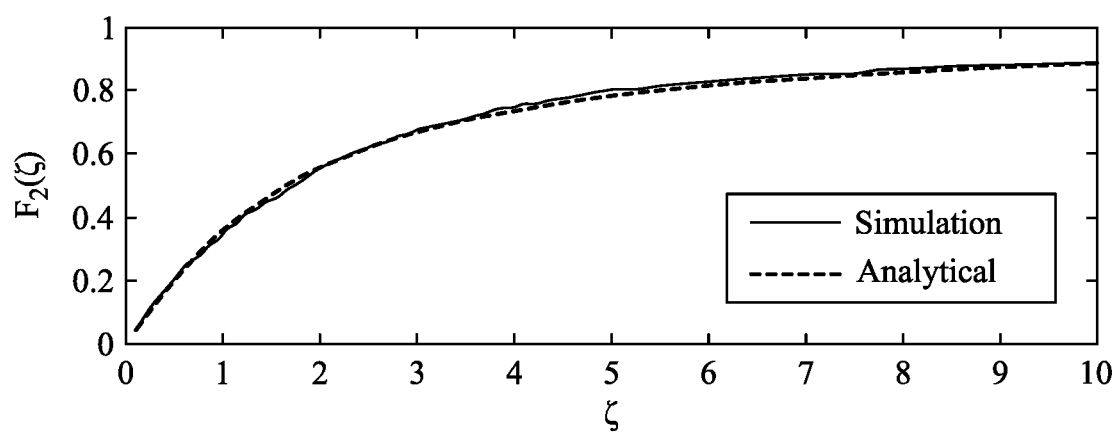
FIG. 3B is a graph of the analytical and simulation results of outage probabilities for a second user, in a two user system, according to certain embodiments.
Figure 4A:
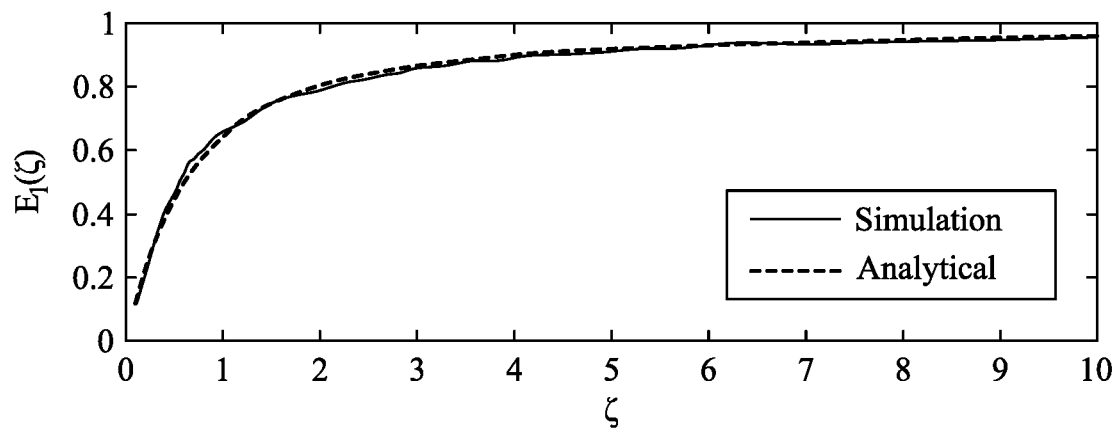
FIG. 4A is a graph of analytical and simulation results of outage probabilities of an eavesdropper device with respect to a first user, in a two user system, according to certain embodiments.
Figure 4B:
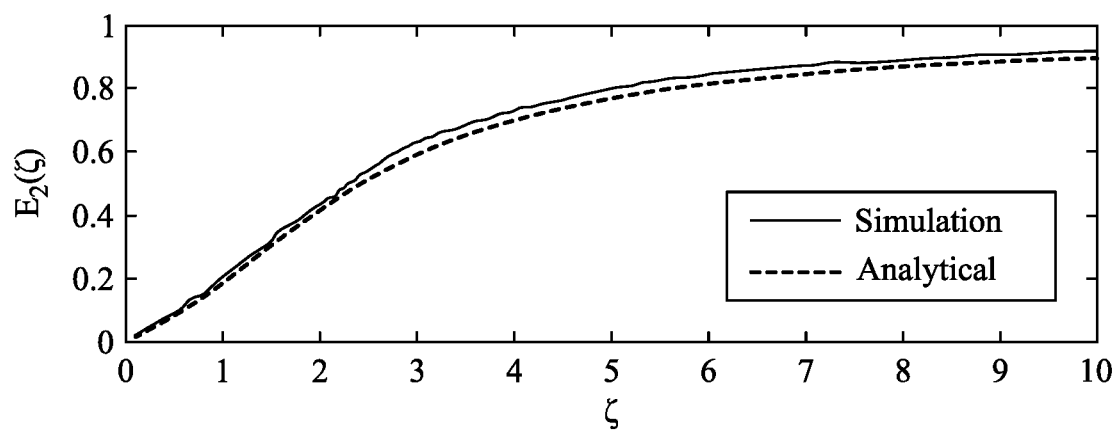
FIG. 4B is a graph of analytical and simulation results of outage probabilities of an eavesdropper device with respect to a second user, in a two user system, according to certain embodiments.

In FIGS. 3A, 3B and 4A, 4B, the comparisons show outage probabilities for either two users (FIG. 3A and FIG. 3B) or an eavesdropper device with respect to the two users (FIG. 4A and FIG. 4B). This scenario considers two RRHs (C=2) and eight transmit antenna elements (M=8). FIG. 3A corresponds to the outage probability of the first user and FIG. 3B corresponds to the outage probability of the second user. FIG. 4A corresponds to the outage probability of the eavesdropper device with respect to the first user, while FIG. 4B corresponds to the outage probability of the eavesdropper device with respect to the second user. As seen from the close agreement between the two sets of lines, the closed-form expressions relied upon to implement the described solutions are valid and accurate.

Figure 5A:
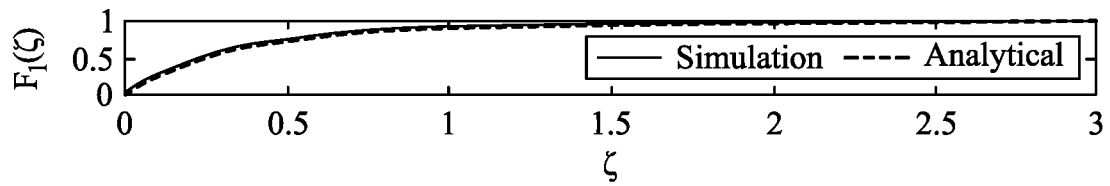
FIG. 5A is a graph of analytical and simulation results of outage probabilities for a first user, in a five user system, according to certain embodiments.
Figure 5B:
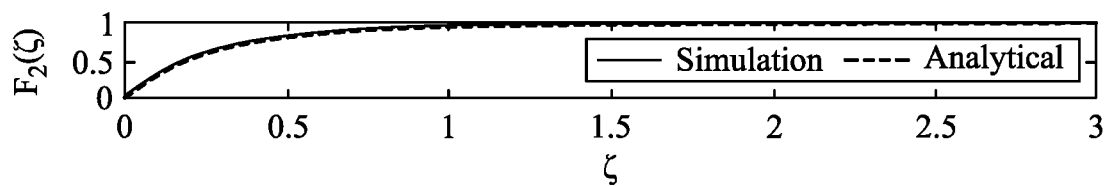
FIG. 5B is a graph of analytical and simulation results of outage probabilities for a second user, in a five user system, according to certain embodiments.
Figure 5C:
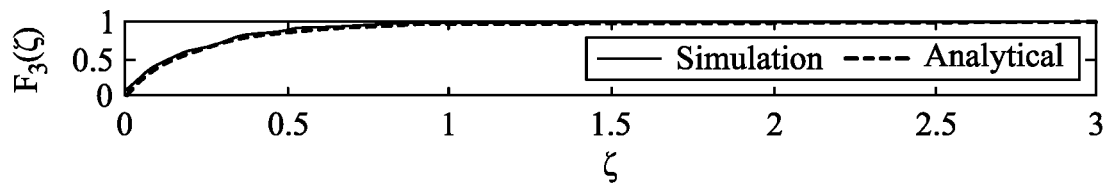
FIG. 5C is a graph of analytical and simulation results of outage probabilities for a third user, in a five user system, according to certain embodiments.
Figure 5D:
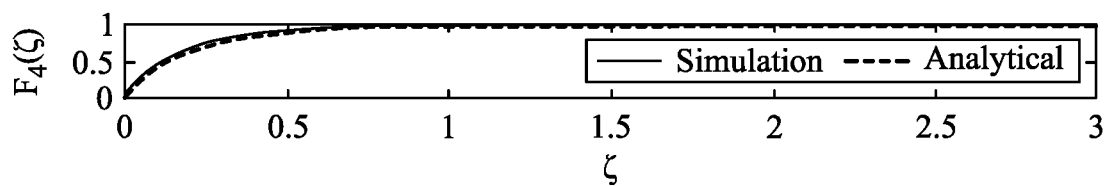
FIG. 5D is a graph of analytical and simulation results of outage probabilities for a fourth user, in a five user system, according to certain embodiments.
Figure 5E:
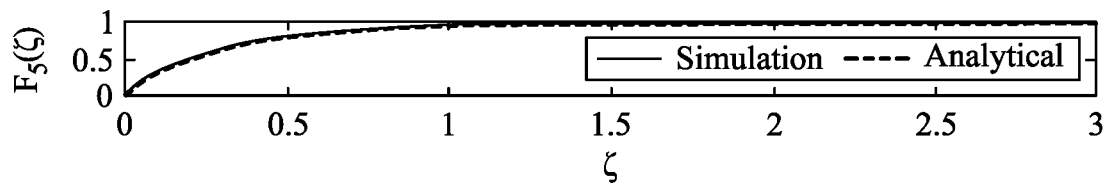
FIG. 5E is a graph of analytical and simulation results of outage probabilities for a fifth user, in a five user system, according to certain embodiments.

In FIG. 5A to FIG. 5E, the comparison depicts the outage probabilities of 5 users, i.e., $F_k(\zeta)$, $k\in(1, 2, 3, 4, 5)$. FIG. 5A corresponds to the outage probability for a first user, FIG. 5B to the outage probability for a second user, FIG. 5C to the outage probability for a third user, FIG. 5D to the outage probability for a fourth user, and FIG. 5E to the outage probability for a fifth user. In this set of simulations, the number of RRHs is four (C=4), and there are 64 transmit antenna elements (M=64) (i.e., 16 at each RRH).

Figure 6A:
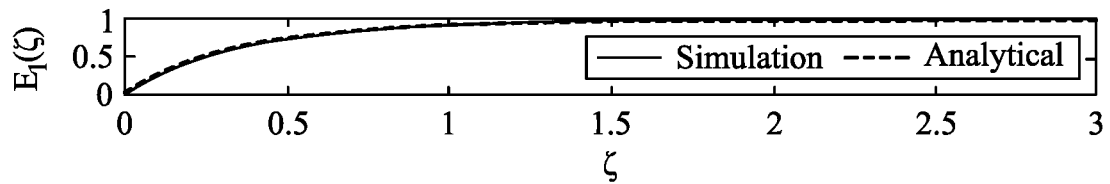
FIG. 6A is a graph of analytical and simulation results of outage probabilities of an eavesdropper device with respect to a first user, in a five user system, according to certain embodiments.
Figure 6B:
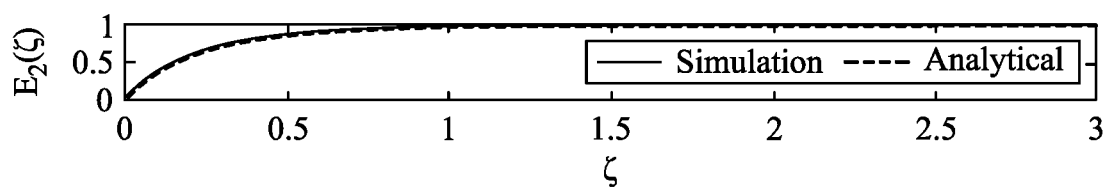
FIG. 6B is a graph of analytical and simulation results of outage probabilities of an eavesdropper device with respect to a second user, in a five user system, according to certain embodiments.
Figure 6C:
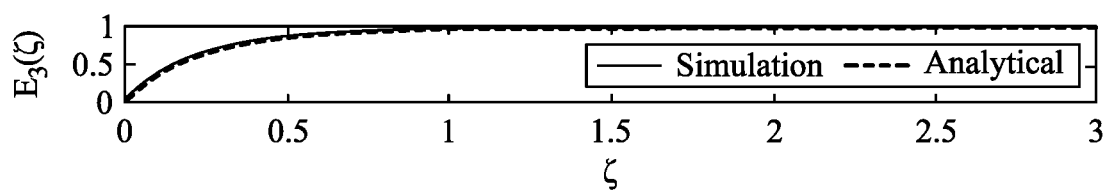
FIG. 6C is a graph of analytical and simulation results of outage probabilities of an eavesdropper device with respect to a third user, in a five user system, according to certain embodiments.
Figure 6D:
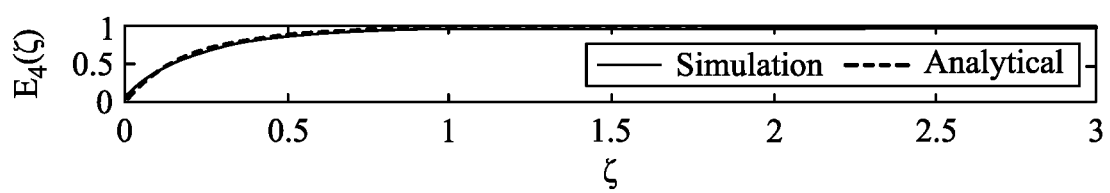
FIG. 6D is a graph of analytical and simulation results of outage probabilities of an eavesdropper device with respect to a fourth user, in a five user system, according to certain embodiments.
Figure 6E:
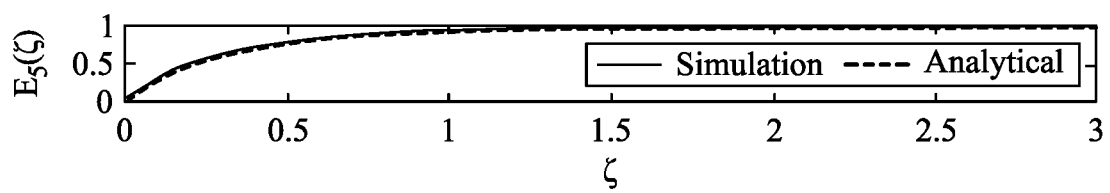
FIG. 6E is a graph of analytical and simulation results of outage probabilities of an eavesdropper device with respect to a fifth user, in a five user system, according to certain embodiments.

In FIG. 6A to FIG. 6E, the analytical and simulation results of the outage probability of an eavesdropper device for the five users is compared, i.e., $E_k(\zeta)$, $k\in(1, 2, 3, 4, 5)$. FIG. 6A corresponds to the outage probability for the eavesdropper with respect to a first user, FIG. 6B to the outage probability for the eavesdropper with respect to a second user, FIG. 6C to the outage probability for the eavesdropper with respect to a third user, FIG. 6D to the outage probability for the eavesdropper with respect to a fourth user, FIG. 6E to the outage probability for the eavesdropper with respect to a fifth user. The number of RRHs is assumed at four, and there are 64 transmit antenna elements. Again, the two results show a high degree of validity and accuracy in the underlying assumptions/mathematics.

Figure 7A:
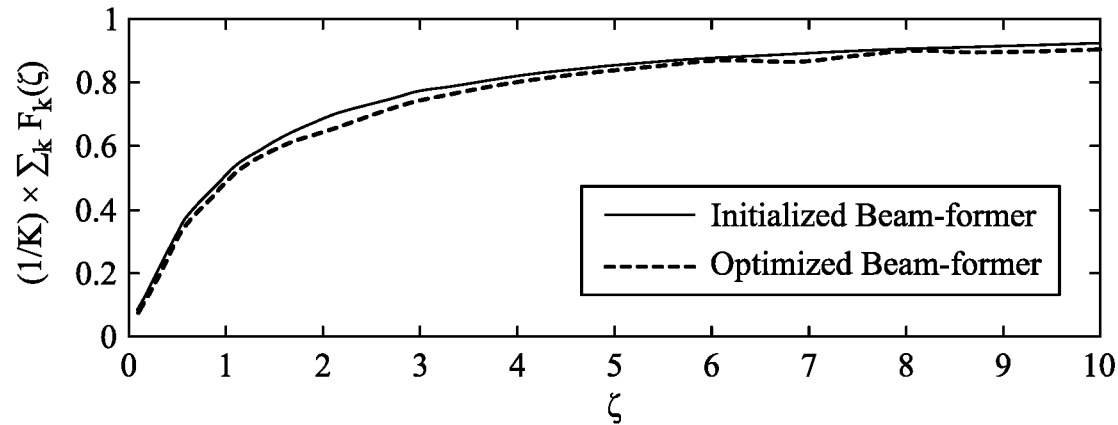
FIG. 7A is a graph comparing simulation results before and after optimization of a sum user outage probability in a two-user system, according to certain embodiments.
Figure 7B:
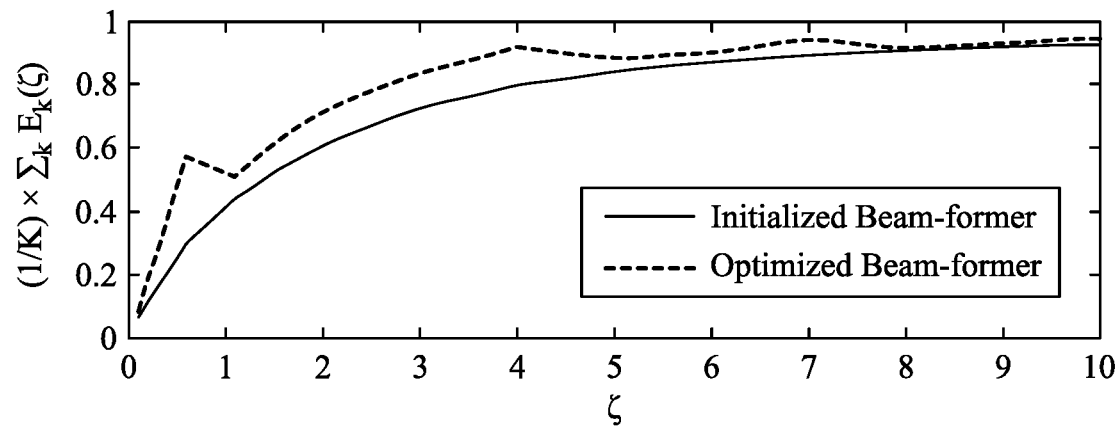
FIG. 7B is a graph comparing simulation results before and after optimization of a sum eavesdropper outage probability in a two-user system, according to certain embodiments.

In FIG. 7A, a comparison of a sum of user outage probabilities for all K users and in FIG. 7B a sum of eavesdropper outage probabilities with respect to all K users, before and after optimization are given (normalized between 0 and 1 with the coefficient 1/K). In these figures, the parameters were set as total users K=2, C=2, and transmit antenna elements M=8. The sum outage probability of an eavesdropper device after optimization is observably more than during the initialization phase. The improvement in secrecy at the physical layer is achieved while only slightly reducing the sum outage probability of users as depicted in FIG. 7A.

Figure 8A:
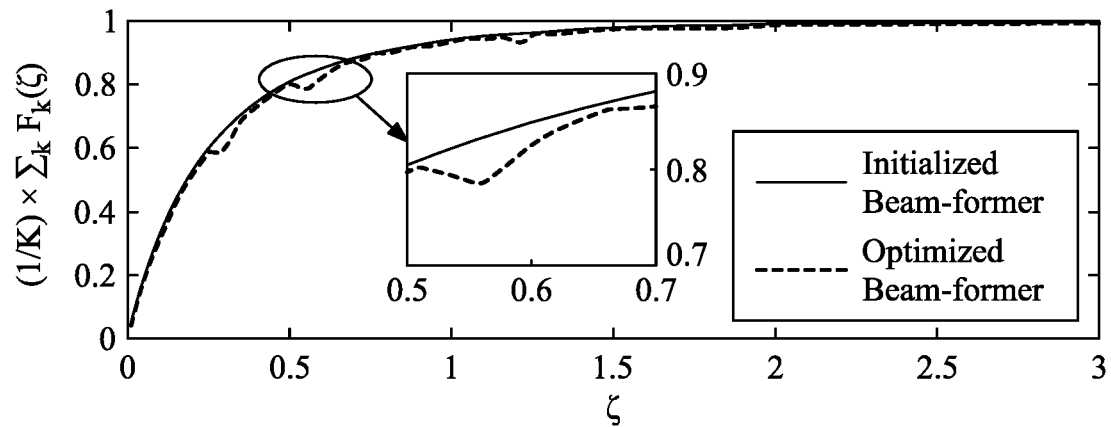
FIG. 8A is a graph comparing simulation results before and after optimization of a sum user outage probability in a five-user system, according to certain embodiments.
Figure 8B:
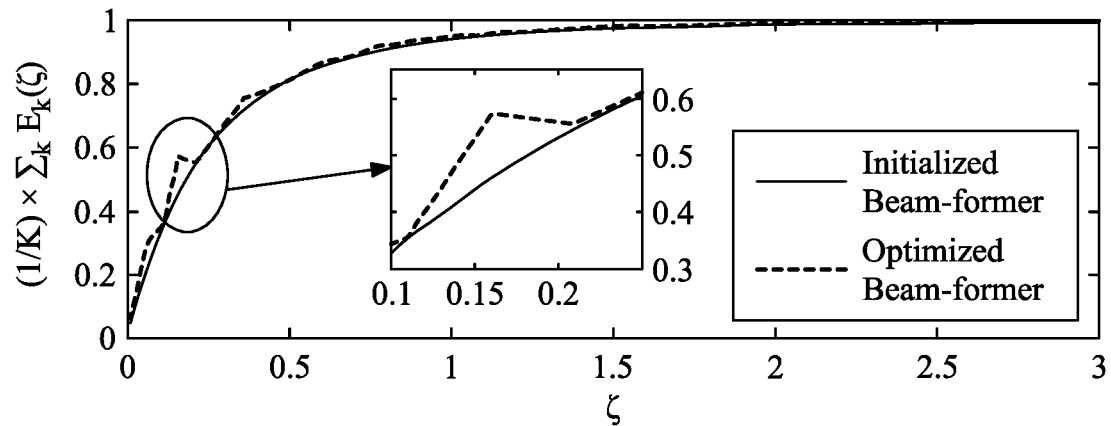
FIG. 8B is a graph comparing simulation results before and after optimization of a sum eavesdropper outage probability in a five-user system, according to certain embodiments.

In FIG. 8A and FIG. 8B, a comparison of a sum of user outage probabilities (for all K users) and a sum of eavesdropper outage probabilities (with respect to all K users) are again shown (in normalized fashion) for before and after optimization. In these simulations, the relevant parameters were five total users (K=5), four RRHs (C=4), and 64 transmit antenna elements (M=64). With the selected parameters, the constraint conditions were still achieved. Moreover, as represented in the inset images, the optimized values at certain SINR values yield significant performance improvements.

Figure 9:
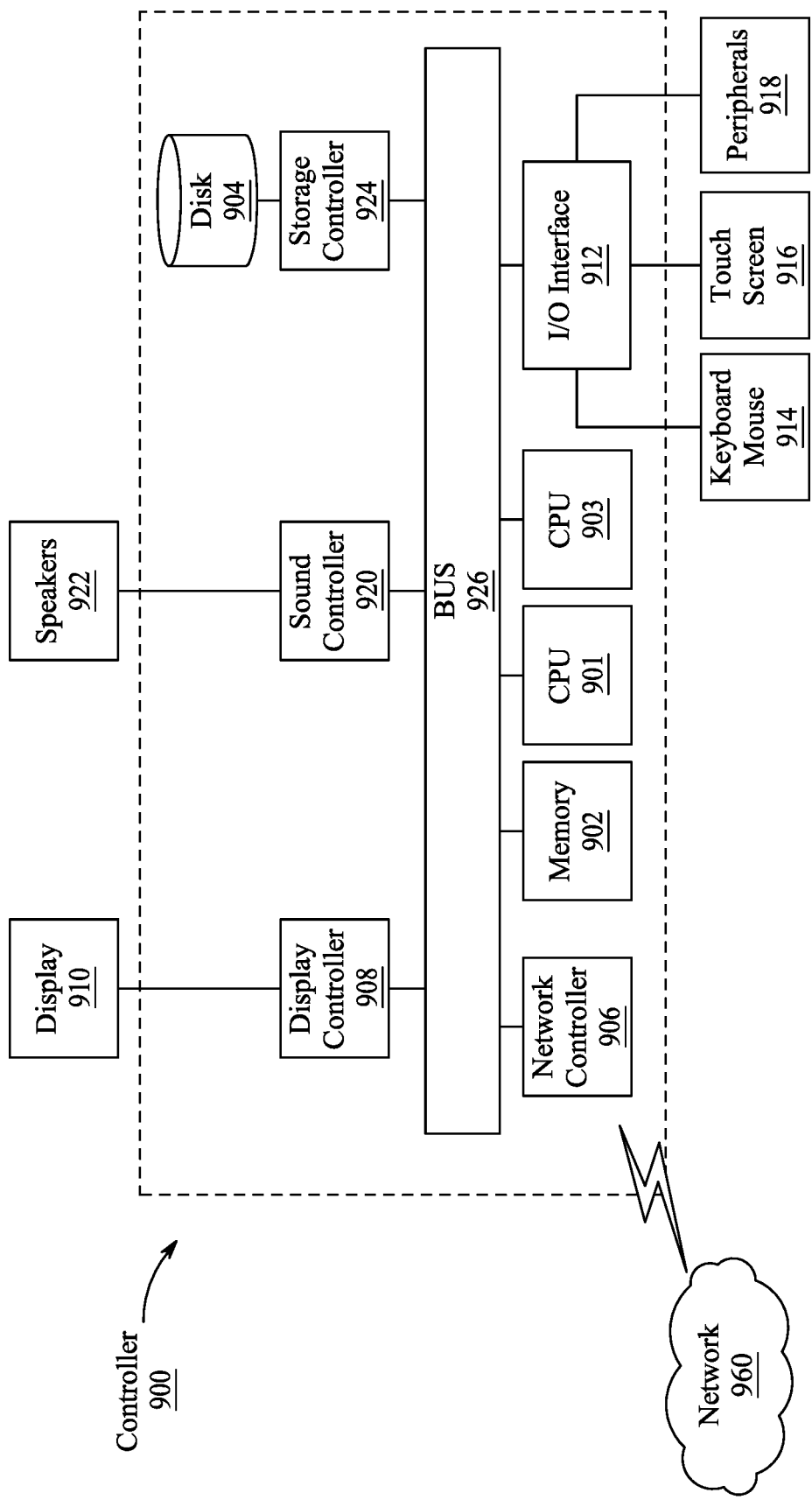
FIG. 9 is an illustration of a non-limiting example of details of computing hardware used in the computing system, according to exemplary aspects of the present disclosure.

Next, further details of the hardware description of the computing environment of the MU Massive MIMO network according to exemplary embodiments is described with reference to FIG. 9. In FIG. 9, a controller 900 is described and is representative of a computer as described above with respect to the base station and/or RRH. Controller 900 is a computing device which includes a CPU 901 that performs the processes described above/below. The process data and instructions may be stored in memory 902. These processes and instructions may also be stored on a storage medium disk 904 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 901, 903 and an operating system such as Microsoft Windows 7, Microsoft Windows 10, UNIX, Solaris, LINUX, Apple MAC-OS and other systems known to those skilled in the art.

The hardware elements in order to achieve the computing device may be realized by various circuitry elements, known to those skilled in the relevant art. For example, CPU 901 or CPU 903 may be a Xenon or Core processor from Intel of America or an Opteron processor from AMD of America, or may be other processor types that would be recognized by one of ordinary skill in the art. Alternatively, the CPU 901, 903 may be implemented on an FPGA, ASIC, PLD or using discrete logic circuits, as one of ordinary skill in the art would recognize. Further, CPU 901, 903 may be implemented as multiple processors cooperatively working in parallel to perform the instructions of the processes described above.

The computing device in FIG. 9 also includes a network controller 906, such as an Intel Ethernet PRO network interface card from Intel Corporation of America, for interfacing with network 960. As can be appreciated, the network 960 can be a public network, such as the Internet, or a private network such as an LAN or WAN network, or any combination thereof and can also include PSTN or ISDN subnetworks. The network 960 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 908, such as a NVIDIA GeForce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 914 as well as a touch screen panel 916 on or separate from display 910. General purpose I/O interface also connects to a variety of peripherals 918 including printers and scanners, such as an OfficeJet or DeskJet from Hewlett Packard.

A sound controller 920 is also provided in the computing device such as Sound Blaster X-Fi Titanium from Creative, to interface with speakers/microphone 922 thereby providing sounds and/or music.

The general-purpose storage controller 924 connects the storage medium disk 904 with communication bus 926, which may be an ISA, EISA, VESA, PCI, or similar, for interconnecting all of the components of the computing device. A description of the general features and functionality of the display 910, keyboard and/or mouse 914, as well as the display controller 908, storage controller 924, network controller 906, sound controller 920, and general purpose I/O interface 912 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 10.

Figure 10:
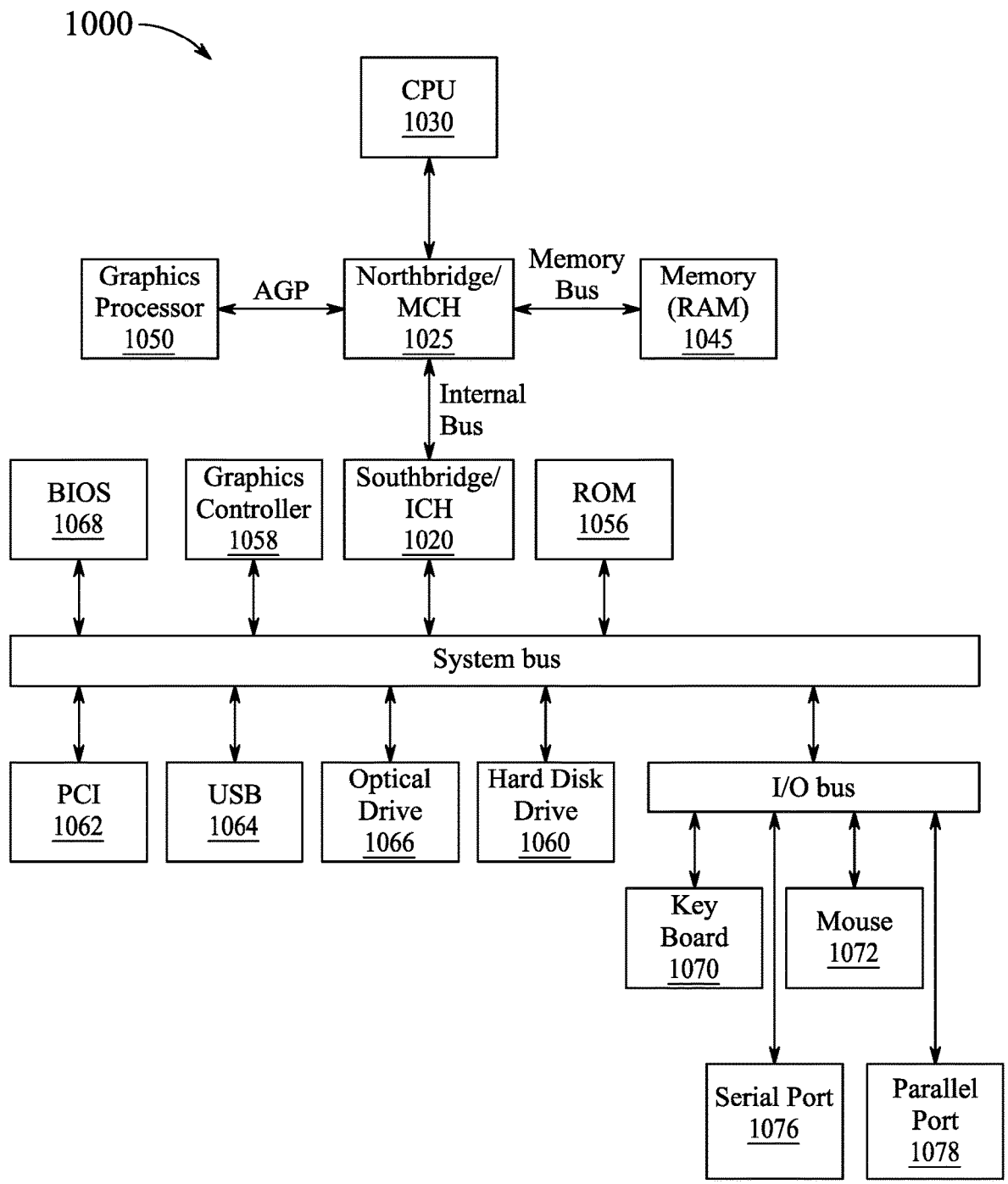
FIG. 10 is an exemplary schematic diagram of a data processing system used within the computing system, according to exemplary aspects of the present disclosure.

FIG. 10 shows a schematic diagram of a data processing system, according to certain embodiments, for performing the functions of the exemplary embodiments. The data processing system is an example of a computer in which code or instructions implementing the processes of the illustrative embodiments may be located.

In FIG. 10, data processing system 1000 employs a hub architecture including a north bridge and memory controller hub (NB/MCH) 1025 and a south bridge and input/output (I/O) controller hub (SB/ICH) 1020. The central processing unit (CPU) 1030 is connected to NB/MCH 1025. The NB/MCH 1025 also connects to the memory 1045 via a memory bus, and connects to the graphics processor 1050 via an accelerated graphics port (AGP). The NB/MCH 1025 also connects to the SB/ICH 1020 via an internal bus (e.g., a unified media interface or a direct media interface). The CPU Processing unit 1030 may contain one or more processors and even may be implemented using one or more heterogeneous processor systems.

Figure 11:
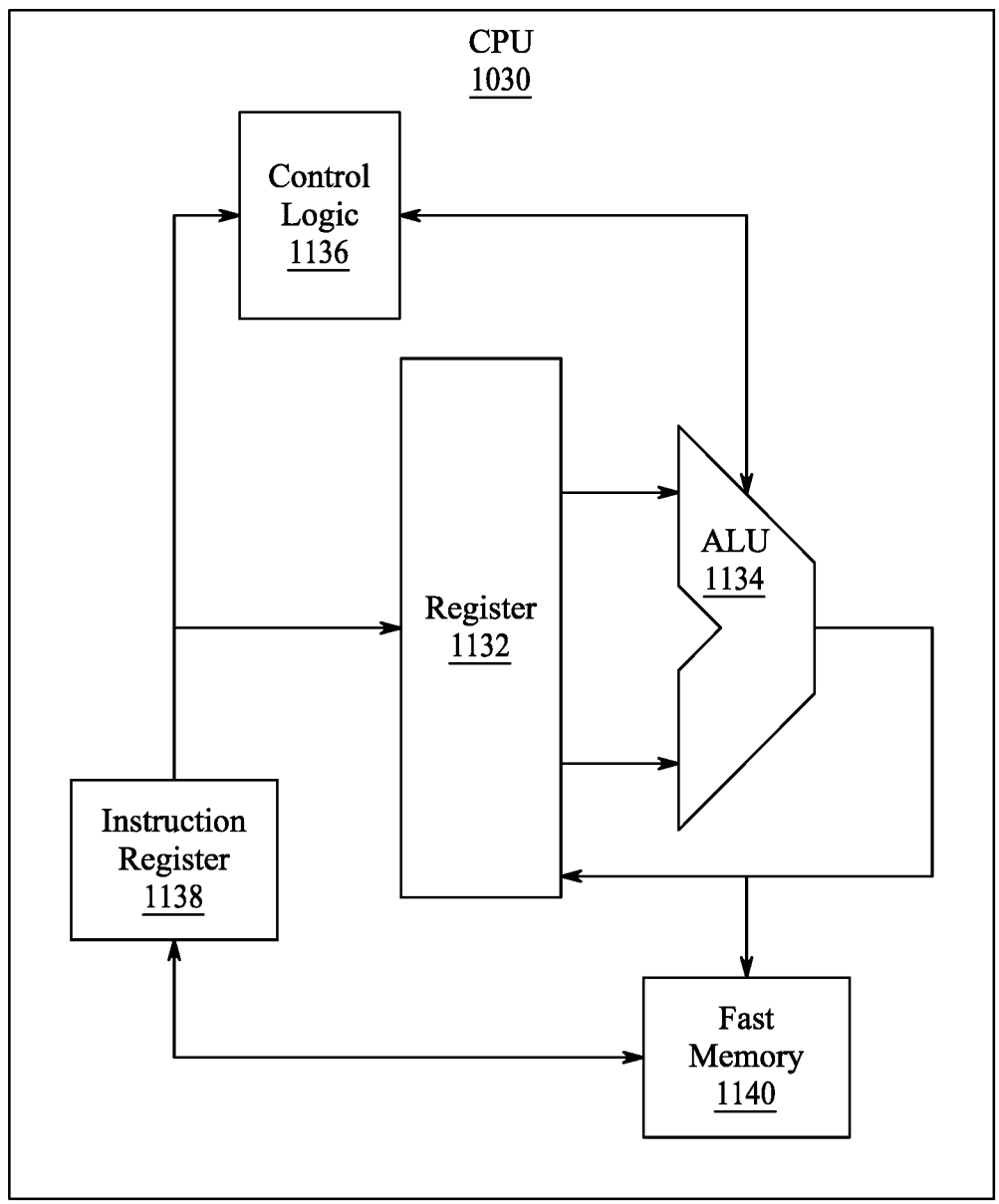
FIG. 11 is an exemplary schematic diagram of a processor used with the computing system, according to exemplary aspects of the present disclosure.

For example, FIG. 11 shows one implementation of CPU 1030. In one implementation, the instruction register 1138 retrieves instructions from the fast memory 1140. At least part of these instructions are fetched from the instruction register 1138 by the control logic 1136 and interpreted according to the instruction set architecture of the CPU 1030. Part of the instructions can also be directed to the register 1132. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1134 that loads values from the register 1132 and performs logical and mathematical operations on the loaded values according to the instructions. The results from these operations can be feedback into the register and/or stored in the fast memory 1140. According to certain implementations, the instruction set architecture of the CPU 1030 can use a reduced instruction set architecture, a complex instruction set architecture, a vector processor architecture, and/or a very large instruction word architecture. Furthermore, the CPU 1030 can be based on the Von Neuman model or the Harvard model. The CPU 1030 can be a digital signal processor, an FPGA, an ASIC, a PLA, a PLD, or a CPLD. Further, the CPU 1030 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 10, the data processing system 1000 can include that the SB/ICH 1020 is coupled through a system bus to an I/O Bus, a read only memory (ROM) 1056, universal serial bus (USB) port 1064, a flash binary input/output system (BIOS) 1068, and a graphics controller 1058. PCI/PCIe devices can also be coupled to SB/ICH 1088 through a PCI bus 1062.

The PCI devices may include, for example, Ethernet adapters, add-in cards, and PC cards for notebook computers. The Hard disk drive 1060 and CD-ROM 1066 can use, for example, an integrated drive electronics (IDE) or serial advanced technology attachment (SATA) interface. In one implementation the I/O bus can include a super I/O (SIO) device.

Further, the hard disk drive (HDD) 1060 and optical drive 1066 can also be coupled to the SB/ICH 1020 through a system bus. In one implementation, a keyboard 1070, a mouse 1072, a parallel port 1078, and a serial port 1076 can be connected to the system bus through the I/O bus. Other peripherals and devices that can be connected to the SB/ICH 1020 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 12:
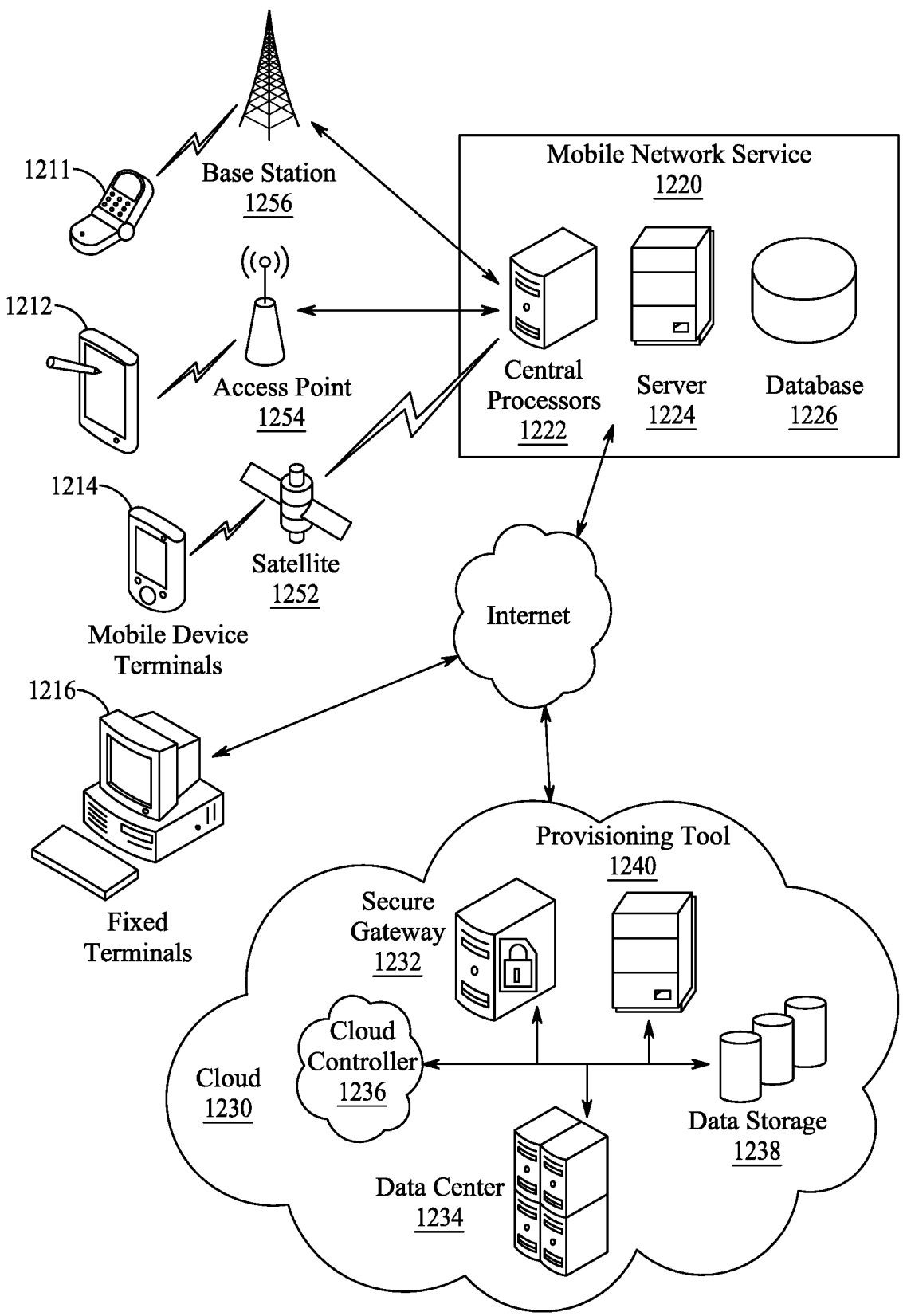
FIG. 12 is an illustration of a non-limiting example of distributed components which may share processing with a controller, according to exemplary aspects of the present disclosure.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 12, in addition to various human interface and communication devices (e.g., cell phones 1211, personal digital assistants (PDAs) 1212, smart phones or mobile device terminals 1214, display monitors or fixed terminals 1216, tablets not shown or numbered). The network may be a private network, such as a LAN or WAN, or may be a public network, such as the Internet. Access may be through a satellite 1252, an access point 1254, or base station 1256, to a mobile network service 1220. The mobile network service 1220 can include central processor(s) 1222, server(s) 1224, or database(s) 1226. Input to the system may be received via direct user input and received remotely either in real-time or as a batch process. Back-end processing may be enabled by cloud services 1230, with the aid of one or more of secure gateway 1232, data center 1234, cloud controller 1236, data storage 1238, and/or provisioning tool 1240. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method of securing communications in a Multi User (MU) Massive-Multi User Multiple Input Multiple Output (MIMO) network including a base station, a first plurality of C remote radio heads each including M/C antennas arrays, where M is the total number of antenna arrays of the C remote radio heads, each radio head is connected to the base station by a high-speed fiber cable, a second plurality of K user devices, and a third plurality of K eavesdropper devices, the method comprising:

estimating, by the base station, an initial precoding matrix based on a first estimated value of a signal to interference plus noise ratio (SINR);

determining, by the base station, a $k^{th}$ user device outage probability value based on the estimated initial precoding matrix, wherein the user device outage probability value indicates a probability of an outage to occur on the $k^{th}$ user device within a first time period;

determining, by the base station, a $k^{th}$ eavesdropper device outage probability value associated with a $k^{th}$ eavesdropper device, wherein the eavesdropper device outage probability value indicates a probability of an outage to occur on the eavesdropper device within a second time period;

determining, by the base station, an optimized beamformer weight matrix based on the $k^{th}$ user device outage probability value and the $k^{th}$ eavesdropper device outage probability value;

determining, by the base station, whether the optimized beamformer weight matrix satisfies at least one of a plurality of outage conditions;

when the optimized beamformer weight matrix satisfies the at least one of the plurality of outage conditions:
 transmitting, by the base station, through the high-speed fiber cable, the optimized beamformer weight matrix to each remote radio head; and
 transmitting, by each remote radio head, downlink signals from each antenna array at the first estimated value of the SINR to the $k^{th}$ user device using a $k^{th}$ beamformer vector of the optimized beamformer weight matrix.

2. The method of claim 1, further comprising:

when the optimized beamformer weight matrix does not satisfy the at least one of the plurality of outage conditions:

generating, by the base station, a second estimated SINR by adding 1 to the index of the first estimated SINR;
 generating, by the base station, a second optimized beamformer weight matrix using the second estimated SINR;
 determining, by the base station, whether the second optimized beamformer weight matrix satisfies at least one of the plurality of outage conditions;
 when the second optimized beamformer weight matrix satisfies the at least one of the plurality of outage conditions, transmitting, by the base station, through the high-speed fiber cable, the optimized beamformer weight matrix to each remote radio head; and
 when the second optimized beamformer weight matrix does not satisfy the at least one of the plurality of outage conditions, incrementing the second estimated SINR by adding 1 at each iteration, forming an incremented optimized beamformer weight matrix at each iteration until the incremented beamformer weight matrix satisfies at least one of the plurality of outage conditions; and transmitting the incremented beamformer weight matrix to each radio head.

3. The method of claim 2, wherein the first estimated value of the SINR is selected at a first time index value, i, and the second estimated SINR is selected at a second time index value equal to i+1.

4. The method of claim 2, further comprising:

incrementing the first time index value to a second time index value, upon transmitting the downlink signal to the plurality of devices at the first estimated value of the SINR;

determining whether the second time index value is less than a threshold time index value; and re-estimating the initial precoding matrix based on the second estimated value of the SINR threshold, when the second time index value is less than the threshold time index value.

5. The method of claim 4, further comprising:

re-estimating the initial precoding matrix based on a second estimated value of the SINR, when the optimized beamformer weight matrix does not satisfy the at least one of the plurality of outage conditions.

6. The method of claim 5, further comprising:

determining a re-estimated user device outage probability value associated with the $k^{th}$ user device based on the re-estimated initial precoding matrix;

determining a re-estimated eavesdropper device outage probability value associated with the $k^{th}$ eavesdropper device based on the re-estimated initial precoding matrix;

determining an updated optimized beamformer weight matrix based on the re-estimated user device outage probability value and the re-estimated eavesdropper device outage probability value;

determining whether the updated optimized beamformer weight matrix satisfies at least one of the plurality of outage conditions; and when the updated optimized beamformer weight matrix satisfies the at least one of the plurality of outage conditions, transmitting, by the base station, through the high-speed fiber cable, the updated optimized beamformer weight matrix to each of the first plurality of remote radio heads; and transmitting, by each remote radio head, downlink signals from each antenna array to the each of the second plurality user devices using a respective beamformer vector of the updated optimized beamformer weight matrix.

7. The method of claim 2, further comprising:
determining an outage probability, $F_k(W,\zeta)$ associated with the $k^{th}$ user device based on:

$$F_k(W,\zeta) = 1 - \sum_{n=1}^{N} \frac{\lambda_n^N e^{-\sigma_k^2 \zeta/\lambda_n}}{\prod_{\substack{i=1 \\ i \neq n}}^{N} (\lambda_n - \lambda_i)|\lambda_n|} u\left(\frac{\sigma_k^2 \zeta}{\lambda_n}\right)$$

where W is the optimized beamformer weight matrix, n=1–N is a first time index, $\zeta$ is the value of the first estimated SINR, $\sigma_k$ is a standard deviation of a zero mean complex additive white Gaussian noise at the $k^{th}$ user device, $\lambda_n$ is an eigenvalue of a matrix A–$\zeta$B, where $$A = p_f R_k^{1/2} w_k w_k^H R_k^{H/2}$$

$$B = p_f R_k^{1/2} \left(\sum_{\substack{i=1 \\ i \neq k}}^{k} w_i w_i^H\right) R_k^{H/2}$$

where $p_f$ is a signal power of the downlink signal, H is a complex zero-mean Gaussian random vector, $w_k$ is a $k^{th}$ vector of the matrix W, and $R_k$ is a received signal at the kth user device.

8. The method of claim 7, further comprising:
determining an outage probability $E_k(W,\zeta)$ associated with the $k^{th}$ eavesdropper device based on:

$$E_k(W,\zeta) = 1 - \sum_{t=1}^{T} \frac{\delta_n^N e^{-\sigma_E^2 \zeta/\delta_t}}{\prod_{\substack{i=1 \\ i \neq n}}^{T} (\delta_t - \delta_i)|\delta_t|} u\left(\frac{\sigma_E^2 \zeta}{\delta_t}\right)$$

where t=1 to T is a second time index, $\sigma_k$ is a standard deviation of a zero mean complex additive white Gaussian noise at the $k^{th}$ eavesdropper device, $\delta_t$ is an eigenvalue of a matrix C–$\gamma$thD, where:

$$C = p_f R_E^{1/2} w_k w_k^H R_E^{H/2}$$

$$D = p_f R_E^{1/2} \left(\sum_{\substack{i=1 \\ i \neq k}}^{k} w_i w_i^H\right) R_E^{H/2}$$

where H is a complex zero-mean Gaussian random vector, $w_i$ is an $i^{th}$ vector of the matrix W, and $R_E$ is a received signal at the kth eavesdropper device.

9. The method of claim 8, further comprising:
calculating an SINR threshold value, $r_k$ for the $k_{th}$ user device based on:

$$r_k = \frac{p_f |h_k^H w_k|^2}{p_f \sum_{\substack{i=1 \\ i \neq k}}^{k} |h_k^H w_i|^2 + \sigma_k^2}.$$

10. The method of claim 9, further comprising:
performing a whitening transformation of the SINR threshold value for the $k_{th}$ user device, $r_k$, such that $r_k$ (whitened) is given by:

$$r_k = \frac{\|\tilde{h}_k\|_A^2}{\|\tilde{h}_k\|_B^2 + \sigma_k^2},$$

where $\tilde{h}_k$ is a white noise vector.

11. The method of claim 10, further comprising:
calculating, by the base station, the first constraint condition by:

$$\{\Sigma_k F_k(W^{opt},\zeta^i)\} \leq \{\Sigma_k F_k(W^{int},\zeta^i)\}; \text{and}$$

calculating the second constraint condition by:

$$\{\Sigma_k E_k(W^{opt},\zeta^i)\} \geq \{\Sigma_k E_k(W^{int},\zeta^i)\},$$

where $W^{opt}$ is the optimized beamformer weight matrix and $W^{int}$ is the initial precoding matrix.

12. The method of claim 1, wherein the plurality of outage conditions includes:
a first constraint coefficient that sums the power outage of the second plurality of user devices with the optimized beamformer weight matrix, wherein the first constraint coefficient is upper bounded by a sum of the outage of the second plurality of user devices with the estimated initial precoding matrix; and
a second constraint coefficient that sums the power outage of the eavesdropper device with the optimized beamformer weight matrix, wherein the second constraint coefficient is lower bounded by the sum outage of the third plurality of eavesdropper devices with the estimated initial precoding matrix.

13. The method of claim 1, further comprising:
retrieving, from a base station memory, historic SINR data; and
estimating, by the base station, the first estimated value of the SINR from the historic SINR data.

14. A system for secured communication in a Multi User (MU) Massive-Multi User Multiple Input Multiple Output (MIMO) network, comprising:
a base station including transceiver circuitry, a first antenna array, a controller, a memory including program instructions and at least one processor;
a first plurality of C remote radio heads each including M/C antennas arrays, where M is a total number of antenna arrays of the first plurality of C remote radio heads, wherein each radio head is operatively connected to the base station by a high-speed fiber cable;
a second plurality of K user devices;
a third plurality of K eavesdropper devices;
wherein the memory further includes historic data associated with previous communications and a plurality of outage conditions;
wherein the processor is configured to:
retrieve the historic data;
estimate a first estimated value of a signal to interference plus noise ratio (SINR);
generate an optimized beamformer weight matrix;
determine whether the optimized beamformer weight matrix satisfies at least one of a plurality of outage conditions;
when the optimized beamformer weight matrix satisfies the at least one of the plurality of outage conditions:

transmit, through the high-speed fiber cables, the optimized beamformer weight matrix to each remote radio head; and wherein each remote radio head is configured to transmit downlink signals from each antenna array at the first estimated value of the SINR to a $k^{th}$ user device using a $k^{th}$ beamformer vector of the optimized beamformer weight matrix.

15. The system of claim 14, wherein the processor is further configured to transmit downlink signals from the transceiver at the first estimated value of the SINR to the $k^{th}$ user device using the $k^{th}$ beamformer vector of the optimized beamformer weight matrix.

16. The system of claim 15, wherein the processor is further configured to:

estimate an initial precoding matrix based on the first estimated value of a signal to interference plus noise ratio (SINR);

determine a $k^{th}$ user device outage probability value based on the estimated initial precoding matrix, wherein the user device outage probability value indicates a probability of an outage to occur on the $k^{th}$ user device within a first time period;

determine a $k^{th}$ eavesdropper device outage probability value associated with a $k^{th}$ eavesdropper device, wherein the eavesdropper device outage probability value indicates a probability of an outage to occur on the eavesdropper device within a second time period; and generate the optimized beamformer weight matrix based on the $k^{th}$ user device outage probability value and the $k^{th}$ eavesdropper device outage probability value.

17. The system of claim 16, wherein the processor is further configured to, when the optimized beamformer weight matrix does not satisfy the at least one of the plurality of outage conditions:

generate a second estimated SINR by adding 1 to the first estimated SINR;

generate a second optimized beamformer weight matrix using the second estimated SINR;

determine whether the second optimized beamformer weight matrix satisfies at least one of the plurality of outage conditions;

when the second optimized beamformer weight matrix satisfies the at least one of the plurality of outage conditions, transmit, through the high-speed fiber cable, the optimized beamformer weight matrix to each remote radio head; and when the second optimized beamformer weight matrix does not satisfy the at least one of the plurality of outage conditions, increment the second estimated SINR by adding 1 at each iteration, form an incremented optimized beamformer weight matrix at each iteration until the incremented beamformer weight matrix satisfies at least one of the plurality of outage conditions; and transmit the incremented beamformer weight matrix to each radio head.

18. The system of claim 14, wherein the plurality of outage conditions includes:

a first constraint coefficient based on a sum of the power outages of the second plurality of user devices and the optimized beamformer weight matrix, wherein the first constraint coefficient is upper bounded by a sum of the outages of the second plurality of user devices with the estimated initial precoding matrix; and a second constraint coefficient that based on a sum of the power outages of the eavesdropper devices with the optimized beamformer weight matrix, wherein the second constraint coefficient is lower bounded by the sum of the outages of the third plurality of eavesdropper devices with the estimated initial precoding matrix.

19. A non-transitory computer readable medium having instructions stored therein that, when executed by one or more processors, cause the one or more processors to perform a method of securing communications in a Multi User (MU) Massive-Multi User Multiple Input Multiple Output (MIMO) network including a base station, a first plurality of C remote radio heads each including M/C antennas arrays, where M is the total number of antenna arrays of the C remote radio heads, each radio head is connected to the base station by a high-speed fiber cable, a second plurality of K user devices, and a third plurality of K eavesdropper devices, the method comprising:

estimating, by the base station, an initial precoding matrix based on a first estimated value of a signal to interference plus noise ratio (SINR);

determining, by the base station, a $k^{th}$ user device outage probability value based on the estimated initial precoding matrix, wherein the user device outage probability value indicates a probability of an outage to occur on the $k^{th}$ user device within a first time period;

determining, by the base station, a $k^{th}$ eavesdropper device outage probability value associated with a $k^{th}$ eavesdropper device, wherein the eavesdropper device outage probability value indicates a probability of an outage to occur on the eavesdropper device within a second time period;

determining, by the base station, an optimized beamformer weight matrix based on the $k^{th}$ user device outage probability value and the $k^{th}$ eavesdropper device outage probability value;

determining, by the base station, whether the optimized beamformer weight matrix satisfies at least one of a plurality of outage conditions;

when the optimized beamformer weight matrix satisfies the at least one of the plurality of outage conditions:

transmitting, by the base station, through the high-speed fiber cable, the optimized beamformer weight matrix to each remote radio head;

transmitting, by each remote radio head, downlink signals from each antenna array at the first estimated value of the SINR to the $k^{th}$ user device using a $k^{th}$ beamformer vector of the optimized beamformer weight matrix;

when the optimized beamformer weight matrix does not satisfy the at least one of the plurality of outage conditions:

generating, by the base station, a second estimated SINR by adding 1 to the first estimated SINR;

generating, by the base station, a second optimized beamformer weight matrix using the second estimated SINR;

determining, by the base station, whether the second optimized beamformer weight matrix satisfies at least one of the plurality of outage conditions;

when the second optimized beamformer weight matrix satisfies the at least one of the plurality of outage conditions, transmitting, by the base station, through the high-speed fiber cable, the optimized beamformer weight matrix to each remote radio head; and when the second optimized beamformer weight matrix does not satisfy the at least one of the plurality of outage conditions, incrementing the second estimated SINR by adding 1 at each iteration, forming an incremented optimized beamformer weight matrix at each iteration until the incremented beamformer weight matrix satisfies at least one of the plurality of outage conditions; and transmitting the incremented beamformer weight matrix to each radio head.

20. The computer readable method of claim 19, wherein the plurality of outage conditions includes:
- a first constraint coefficient that sums the power outage of the second plurality of user devices with the optimized beamformer weight matrix, wherein the first constraint coefficient is upper bounded by a sum of the outage of the second plurality of user devices with the estimated initial precoding matrix; and
- a second constraint coefficient that sums the power outage of the eavesdropper device with the optimized beamformer weight matrix, wherein the second constraint coefficient is lower bounded by the sum outage of the third plurality of eavesdropper devices with the estimated initial precoding matrix.

\* \* \* \* \*